(12) United States Patent
Takeda et al.

(10) Patent No.: US 6,397,634 B1
(45) Date of Patent: Jun. 4, 2002

(54) BEND-SHAPING METHOD AND APPARATUS FOR A GLASS PLATE

(75) Inventors: Takashi Takeda, Aiko-gun; Yoichi Nemugaki; Ken Nomura, both of Chita-gun; Nozomi Ohtsubo, Aiko-gun; Masanori Tomioka, Chita-gun, all of (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/504,800

(22) Filed: Feb. 15, 2000

(30) Foreign Application Priority Data

Jun. 19, 1998 (JP) .......................................... 10-173103
Jun. 18, 1999 (WO) ................................ PCT/JP99/03259

(51) Int. Cl.⁷ ............................................ C03B 22/023
(52) U.S. Cl. ............................ 65/102; 65/106; 65/107; 65/245; 65/253; 65/287; 65/289
(58) Field of Search ........................ 65/102, 106, 107, 65/245, 253, 287, 289

(56) References Cited

U.S. PATENT DOCUMENTS

| | | | | |
|---|---|---|---|---|
| 1,823,357 A | * | 9/1931 | Frink | 65/106 |
| 1,848,162 A | * | 3/1932 | Cone | 65/253 |
| 1,865,890 A | * | 7/1932 | Drake | 65/253 |
| 1,865,891 A | * | 7/1932 | Drake | 65/253 |
| 1,865,894 A | * | 7/1932 | Fraser | 65/253 |
| 2,223,124 A | | 11/1940 | Owen | |
| 2,526,359 A | * | 10/1950 | Jendrisak | 65/289 |
| 2,590,768 A | * | 3/1952 | Guilleminot et al. | 65/287 |
| 2,724,214 A | * | 11/1955 | Guilleminot | 65/287 |
| 3,343,590 A | * | 9/1967 | Radd | 65/100 |
| 3,545,951 A | | 12/1970 | Nedelec | |
| 4,054,437 A | * | 10/1977 | Ueberwolf et al. | 65/107 |
| 4,054,438 A | * | 10/1977 | Presta | 65/107 |
| 4,123,246 A | | 10/1978 | Johnson | |
| 4,292,065 A | * | 9/1981 | Nedelec et al. | 65/106 |
| 4,556,406 A | | 12/1985 | Kahle | |
| 4,957,528 A | * | 9/1990 | Letemps et al. | 65/106 |

FOREIGN PATENT DOCUMENTS

| | | |
|---|---|---|
| EP | 0 555 079 | 8/1993 |
| FR | 2 221 419 | 10/1974 |
| JP | 60-171238 | 9/1985 |
| JP | 60-171239 | 9/1985 |

\* cited by examiner

Primary Examiner—Michael Colaianni
(74) Attorney, Agent, or Firm—Oblon, Spivak, McClelland, Maier & Neustadt, P.C.

(57) ABSTRACT

A plurality of rollers provided at positions where a transferred glass plate is moved vertically to form a transferring plane formed by the primary rollers into a curved plane, and the curved plane is shifted in the transferring direction of the glass plate with the transfer of the glass plate to bend and shape the glass plate to have a predetermined curvature along the curved plane. Thus, there are obtainable a bending and shaping method and apparatus which does not require the exchanging of rollers in response to the type of glass plate being worked.

20 Claims, 19 Drawing Sheets

Fig. 9
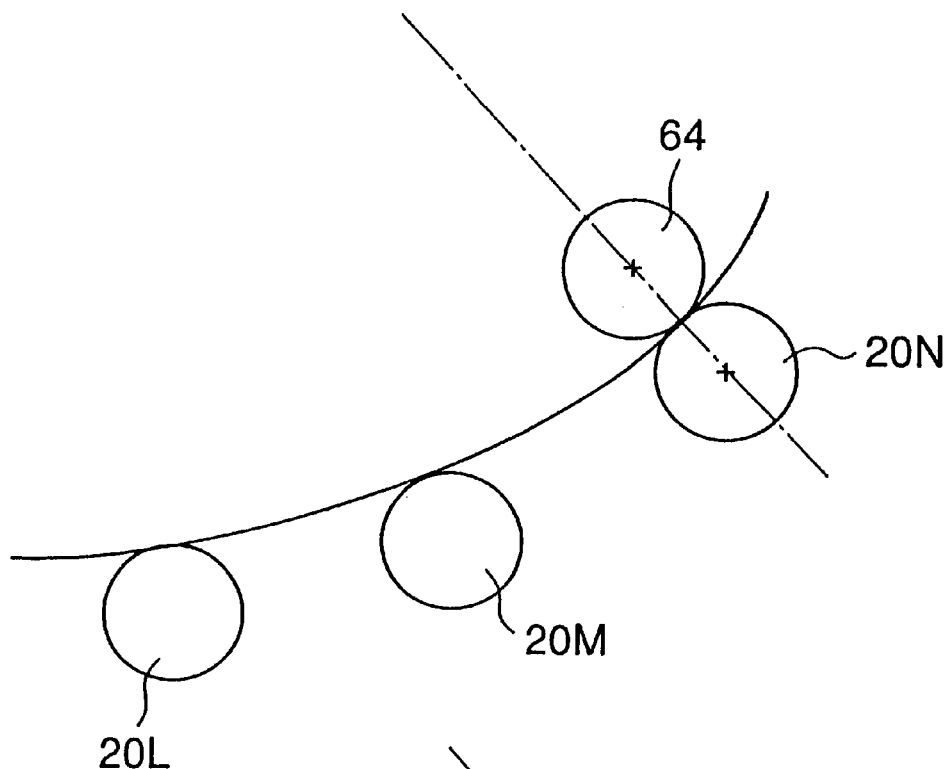
(A)
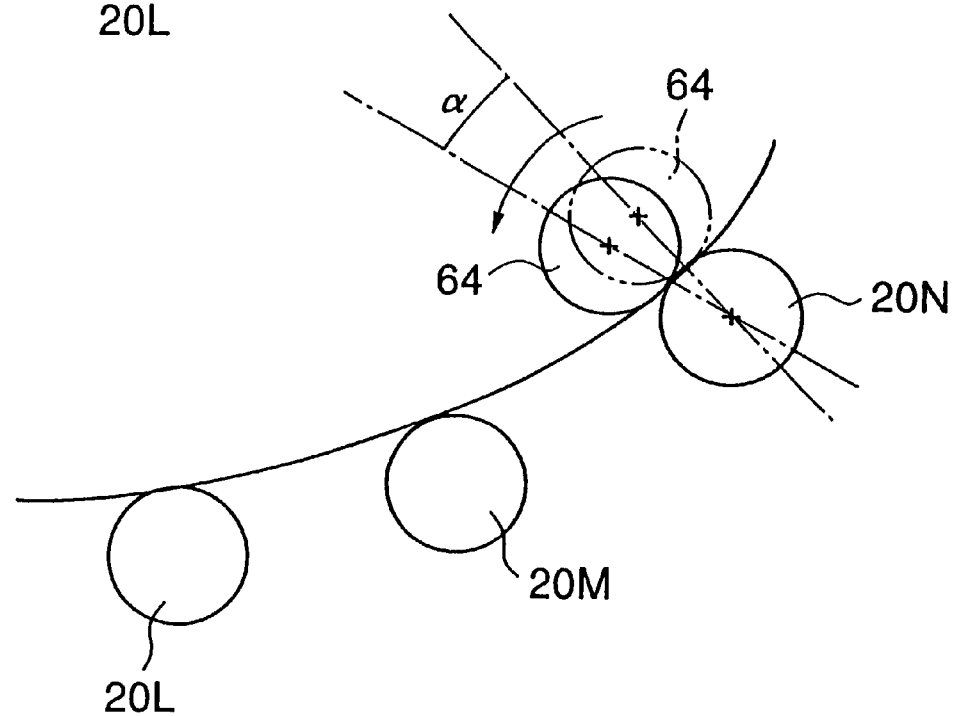
(B)

BEND-SHAPING METHOD AND APPARATUS FOR A GLASS PLATE

TECHNICAL FIELD

The present invention relates to bend-shaping method and apparatus for a glass plate for transporting machines such as automobiles, ships, railways, airplanes and so on or for various usages for buildings and so on. In particular, the present invention relates to a bend-shaping method and apparatus for a glass plate suitable for bend-shaping a glass plate for windows of automobiles.

BACKGROUND ART

There has been known a method for bend-shaping a glass plate by heating the glass plate to around a softening temperature in a heating furnace and transferring the glass plate on a roller conveyor comprising a plurality of curved rollers (in, for example, U.S. Pat. No. 4,123,246). According to this method, the softened glass plate falls by its own weight and the glass plate is bent to meet a curvature of the rollers.

Further, there has been known a method for bend-shaping a glass plate by heating the glass plate to around a softening temperature in a heating furnace and transferring the glass plate by means of a plurality of rollers inclined in a transferring direction so that the transferring path is curved (in, for example, U.S. Pat. No. 4,820,327). According to this method, the softened glass plate falls by its own weight and the glass plate is bent to meet a curvature of the transferring path.

In description, "bend-shaping in a direction perpendicular to a transferring direction" means that the shape of a bend-shaped glass plate is a shape curved around an axis of transferring direction. In other words, the bend-shaped glass plate has a curved shape in cross-section taken vertically along the axis of transferring direction. "Bend-shaping in (along) a transferring direction" means that the shape of a bend-shaped glass plate is a shape curved around the axis perpendicular to the transferring direction. In other words, the bend-shaped glass plate has a curved shape in the cross-section taken vertically along the axis perpendicular to the transferring direction. With respect to the shape of a curved plane formed by a plurality of rollers as described after, phrases "bent in (along) a transferring direction", "curved in a transferring direction" or the like have the same meaning as "bend-shaped in (along) a transferring direction". A phrase "bend-shaped in a direction perpendicular to a transferring direction" is also applicable to description about a curved plane with respect to a direction perpendicular to a transferring direction.

In this description, "perpendicular to a certain direction" means a direction perpendicular to certain direction on a horizontal plane. Further, "upper" or "lower" means "upper" or "lower" with respect to a horizontal plane in this description.

In recent years, there is an increasing demand of production of small quantity and large variety in automobile industries, and glass plates having various curvatures are needed in response to models of automobiles. In a method described in U.S. Pat. No. 4,123,246, it was necessary to exchange rollers to those having a curvature corresponding to a model of automobile to be manufactured. The exchanging work took much time, and it was necessary to prepare rollers having a curvature required for a model to be manufactured. In this method, glass plates are transferred in a direction perpendicular to a direction to be bent. In bend-shaping a glass plate for a side window of an automobile, the direction of a 15 side of the glass plate when it is fitted to an automobile, corresponds to the direction of extending of the rollers. In such state of fitting, a distortion appearing in the glass plate due to the contact of a roller having a distortion is conspicuous.

According to the method described in U.S. Pat. No. 4,820,327 ('327 method), it was necessary to change the arrangement of rollers so as to form a transferring path having a curvature which corresponds to a model to be manufactured.

Such change took much time.

Further, in the '327 method, the transferring direction of the glass plate is changed to a vertical direction. Therefore, the entire equipment to be used for the '327 method is inevitably large. Further, since the glass plate is transferred against the gravity, it is difficult to transfer the glass plate at a high speed, and a special mechanism for preventing the slippage of the glass plate has to be provided. Further, the transferring direction has to be changed from the vertical direction to a horizontal direction for the glass plate having been subjected to bend-shaping and tempering by cooling. A mechanism for changing the transferring direction is complicated, and there is a risk of a damage in the glass plate.

It is an object of the present invention to eliminate the disadvantages of the conventional techniques and to provide new bend-shaping method and apparatus for a glass plate which have been known conventionally.

SUMMARY OF THE INVENTION

The present invention has been made in consideration of the above-mentioned problems and to provide a bend-shaping method for a glass plate comprising heating a glass plate to a bend-shaping temperature in a heating furnace and transferring the heated glass plate along a transferring plane formed by a plurality of rollers of a roller conveyor during which the glass plate is bend-shaped to have a predetermined curvature due to the dead weight of the glass plate, the bend-shaping method for a glass plate being characterized in that said rollers for forming a transferring plane are moved vertically depending on a position of transfer of the glass plate to form a curve in at least a part of the transferring plane so that a predetermined curved plane is formed at the position of transfer where the glass plate is, and the curved plane is shifted, as the propagation of a wave, from an upstream side to a downstream side of the roller conveyor whereby the glass plate is bend-shaped to have a predetermined curvature along the curved plane.

Further, the present invention provides a bend-shaping method for a glass plate comprising heating a glass plate to a bend-shaping temperature in a heating furnace and transferring the heated glass plate along a transferring plane formed by a plurality of rollers which are arranged side by side in a transferring direction of the glass plate during which the glass plate is bend-shaped to have a predetermined curvature due to the dead weight of the glass plate, the bend-shaping method for a glass plate being characterized in that a plurality of rollers at a position where the glass plate is transferred are moved vertically with the transfer of the glass plate so that a predetermined curved plane, which is curved in the transferring direction of the glass plate, is formed in at lease a part of the transferring plane by means of the plurality of rollers at said position, and each of said rollers is sequentially moved vertically with the transfer of the glass plate to shift the curved plane in the transferring direction of the lass plate with the transfer of the glass plate whereby the glass plate is bend-shaped so as to meet the curved lane during the transfer of the glass plate.

Further, the present invention provides a bend-shaping apparatus for a glass plate comprising a heating furnace for heating a glass plate to a bend-shaping temperature and a shaping means, located at a downstream side of the heating furnace, for bend-shaping the glass plate to have a predetermined curvature, the bend-shaping apparatus for a glass plate being characterized in that said shaping means comprises a roller conveyor comprising a plurality of rollers which form a transferring plane for transferring the glass plate, a vertical direction driving means for moving vertically the plurality of rollers, and a control means which controls the driving means to move vertically the rollers so that at least a part of the transferring plane is bent to have a curvature which corresponds to a curvature of the glass plate to be formed whereby a predetermined curved plane is formed by the rollers at the position where the transferred glass plate is, and the curved plane is shifted, as the propagation of a wave, from an upstream side to a downstream side of the roller conveyor, wherein the glass plate is transferred during the shift of the curved plane whereby the glass plate is bend-shaped to have a predetermined curvature to meet the curved plane.

Further, the present invention provides a bend-shaping apparatus for a glass plate comprising a heating furnace for heating a glass plate to a bend-shaping temperature and a shaping means, located at a downstream side of the heating furnace, for bend-shaping the glass plate to have a predetermined curvature, the bend-shaping apparatus for a glass plate being characterized in that said shaping means comprises a roller conveyor comprising a plurality of rollers which are arranged side by side in the transferring direction of the glass plate to form a transferring plane for transferring the glass plate, a vertical direction driving means for moving vertically the plurality of rollers, and a control means which controls the driving means to form a predetermined curved plane curved in the transferring direction of the glass plate in at least a part of the transferring plane by the rollers at the position where the transferred glass plate is, and to move sequentially in a vertical direction the plurality of rollers with the transfer of the glass plate whereby the curved plane is shifted in the transferring direction of the glass plate.

Specifically, each of the rollers is moved vertically with the transfer of the glass plate. With such vertical movement, a curved plane is formed by a plurality of rollers at a position where the transferred glass plate is, and the curved plane is shifted to the transferring direction of the glass plate. In other words, the curved plane corresponds to a wave plane of downward convex shape or a wave plane of upward convex shape; each of rollers corresponds to an oscillating element of the wave, and a stroke length in the vertical movement of each roller corresponds to an amplitude of the wave respectively. The propagation of a wave is generated by providing a phase difference to the vertical movement of each of the rollers so that the phase of each roller as each oscillating element is sequentially changed toward a downstream in the transferring direction, whereby the curved plane is shifted to the transferring direction of the glass plate.

For the vertical movement of each of the rollers, it is preferable that a one cycle of movement is formed by a series of movement from an original position in a vertical direction via descending→ascending to return the original position. In this case, each of the rollers takes (a: an initial state) which represents the beginning of descending at the time when a front edge in a transferring direction of a glass plate as one unit is transferred to it, (b) which represents a one cycle on a movement of descending→ascending during the transfer of the glass plate as one unit, and (c: an end state) which represents the movement of returning to the original position at the time when a rear edge in the transferring direction of the glass plate as one unit is transferred to it. Thus, a roller performs a one cycle of vertical movement from the initial state to the end state while the glass plate as one unit has passed on the roller. When a plurality of glass plates are successively bend-shaped, glass plates as each unit are successively transferred. Accordingly, each of the rollers is repeatedly moved vertically in the order of (a), (b) and (c) for subsequent glass plates as each unit. When a movement of ascending→descending is caused on each of the rollers, the initial state is determined so that the beginning of ascending is at the time when a front edge in the transferring direction of the glass plate as one unit is transferred to it.

When a curved plane having a downward convex shape is to be formed by causing the vertical movement on each roller, the glass plate as one unit is transferred as follows. When a front edge and a rear edge in the transferring direction of the glass plate are located on certain rollers, those rollers are in an initial state (an end state). Accordingly, the positions in a vertical direction of the front edge and the rear edge in the transferring direction of the glass plate are maintained at positions corresponding to the initial state on each roller. A height level in a vertical direction of an imaginary plane (which is horizontal) formed by each of the rollers in the initial state is referred to as "a transferring level". On the other hand, each of the rollers, which corresponds to an intermediate portion of the glass plate, as a portion between the front edge and the rear edge in the transferring direction of the glass plate, is in an intermediate state in one cycle of vertical movement. Accordingly, the intermediate portion of the glass plate is lower in position than the transferring level (the intermediate portion falls downward). Accordingly, the glass plate as one unit is transferred in a manner that the intermediate portion is lower in position than the transferring level while the front edge and the rear edge in the transferring direction are maintained at the transferring level. In a case of forming a curved plane having an upward convex shape, the intermediate portion is upper in position than the transferring level.

"A glass plate as one unit" means usually a single glass plate. In a case of transferring two or more glass plates in a stacked state according to requirement, the two or more glass plates can simultaneously be bend-shaped. Thus, "a glass plate as one unit" includes two or more glass plates in a stacked state. According to the bend-shaping method and apparatus of the present invention, a glass plate as one unit can successively be bend-shaped and a plurality of glass plates as one unit can successively be bend-shaped. Whether a glass plate as one unit is a single glass plate or a glass plate is a plurality of glass plates in a stacked state does not influence largely the basic operation of the bend-shaping method and apparatus for a glass plate of the present invention. From this reason, the words "one unit" can be omitted in this description.

Since the rollers are moved vertically, a transferring rate of a horizontal component of the glass plate depends on a position in a vertical direction of each roller. In this case, if angular speeds of rollers are constant, the transferring rate of a horizontal component of a roller at a lower side is higher than that of a roller at an upper side. If such imbalance of speed is generated, a slip takes place between a roller and the glass plate whereby the glass plate is apt to be damaged.

Accordingly, it is preferable to provide a rotation driving means for rotating independently a plurality of rollers and a control device for controlling the rotation driving means so that transferring rates of a horizontal component of the glass plate become equal. With such measures, the above-mentioned disadvantage can be eliminated, and a glass plate without flaws can be obtained.

The curved plane formed by rollers has the meaning as follows. First, a central axial line is assumed for each roller. Since each of the central axial lines extends in a direction perpendicular to the transferring direction, an imaginary curved plane is formed by connecting smoothly each of the central axial lines. The imaginary curved plane corresponds to a curved plane formed by each of the rollers. Since each of the rollers is in fact has a finite thickness, the curved plane formed by each of the rollers is slightly different from the imaginary curved plane. Namely, the radius of curvature of the curved plane formed by each of the rollers is slightly smaller (about a radius of a roller) than the radius of curvature of the imaginary curved plane. Accordingly, the curved plane formed by each of the rollers corresponds to a curved plane which is slightly smaller than the radius of curvature of the imaginary curved plane.

A predetermined curved plane formed by each of the rollers is a curved plane required depending on positions of rollers for transferring the glass plate. Specifically, at the extremely downstream position in a zone for bend-shaping the glass plate, a curved plane to be formed by the rollers at this position provides a curved shape which is generally in agreement with a curved shape of the glass plate finally obtainable, in the transferring direction of the glass plate.

As an example, a curved plane formed by rollers which are located at an upstream side with respect to the extremely downstream position has a radius of curvature which is larger than a curved plane formed by the rollers at the extremely downstream position. Going to further upstream side, a curved plane formed by rollers at an upstream side has a further larger radius of curvature.

As another example, it is possible that at every position of a zone for bend-shaping the glass plate, the curved plane to be formed by rollers is rendered to be a curved shape which is generally in agreement with a curved shape in the transferring direction of the glass plate finally obtainable. In any case, in order to bend-shape the glass plate into a curved shape of the glass plate finally obtainable, the curved plane to be formed by rollers is rendered to a curved plane determined in correspondence with a position where the transferred glass plate is. In this case, the shape of the curved glass plate is determined in consideration of the thickness of the glass plate and the temperature of the glass plate. It is preferable to constitute an apparatus in a manner capable of determining appropriately as to how the shape of the curved plane is changed (or a predetermined curved shape is provided) depending on these conditions.

The glass plate may not be bent instantaneously due to the own weight. Accordingly, it is preferable that the radius of curvature of a curved plane formed by each of the rollers is reduced gradually from an upstream side to thereby form a gradually reduced radius of curvature whereby a predetermined curved shape of the glass plate can be finally obtained at the extremely downstream position, from the viewpoint of transmitting a sufficient driving force by each of the rollers to the glass plate.

The above-mentioned bend-shaping method and apparatus for a glass plate are to bend-shape a glass plate only in a single direction of transferring direction of the glass plate.

In a case of bend-shaping a glass plate to have a desired shape, e.g., a shape obtained by bend-shaping the glass plate only in a single direction (a simply curved shape), a shape having portions each having a different curvature in the glass plate of simply curved shape (a combined curved shape), a shape obtained by bending a glass plate in a plurality of directions (a complexly curved shape) and so on, it is preferable to add one or more than two measures, as described below, to the above-mentioned bend-shaping method and apparatus for a glass plate.

(1: Correction of a curved shape in a glass plate)

A pressing roller is additionally provided above the rollers. The pressing roller is located in a normal direction on a curved plane and a glass plate is held between the pressing roller and rollers to bend-shape the glass plate so as to meet the curved plane. At this moment, the pressing roller is always located in a normal direction onto the curved plane by means of a pressing roller moving means.

(2: A combined curved shape)

A pressing roller is separately provided above and between adjacent two rollers. A portion of a glass plate, corresponding to a position between the two rollers is pressed by the pressing roller to apply a load to that portion of the glass plate whereby the glass plate is bend-shaped. In this case, a load is applied to the glass plate by moving forward and backward the pressing roller to the transferring plane by means of the pressing roller moving means.

(3: A combined curved shape)

The curved plane is formed so as to have a plurality of radius of curvatures in the transferring direction.

(4: A complexly curved shape)

Air is injected to at least one of an upper face and a lower face of a bend-shaped glass plate from a plurality of air injecting means arranged above and below the transferring plane, the air injecting means being located at a downstream side of the rollers for bend-shaping the glass plate, to bend-shape the glass plate in a direction perpendicular to the transferring direction while a balance of cooling to the upper plane and the lower plane of the glass plate is adjusted.

(5: A complexly curved shape)

Rollers 20 are arranged horizontally in a side-by-side relation in the transferring direction and the rollers are rendered to be inclined with respect to a horizontal plane. Further, the rollers are arranged so that the direction of inclination of rollers adjacent to each other is alternately different (right side lifting and left side lifting in a front view viewed from a downstream side in the transferring direction). A curved plane bent in a direction perpendicular to the transferring direction is formed by adjacent two rollers to thereby bend-shape the glass plate in a direction perpendicular to the transferring direction.

BRIEF DESCRIPTION OF THE DRAWINGS

FIG. 9 is a diagram showing bending operations for the glass plate by the sandwich roller.

BEST MODE FOR CARRYING OUT THE INVENTION

Preferred embodiments of bend-shaping method and apparatus for a glass plate according to the present invention will be described in detail with reference to the drawings.

Figure 1:
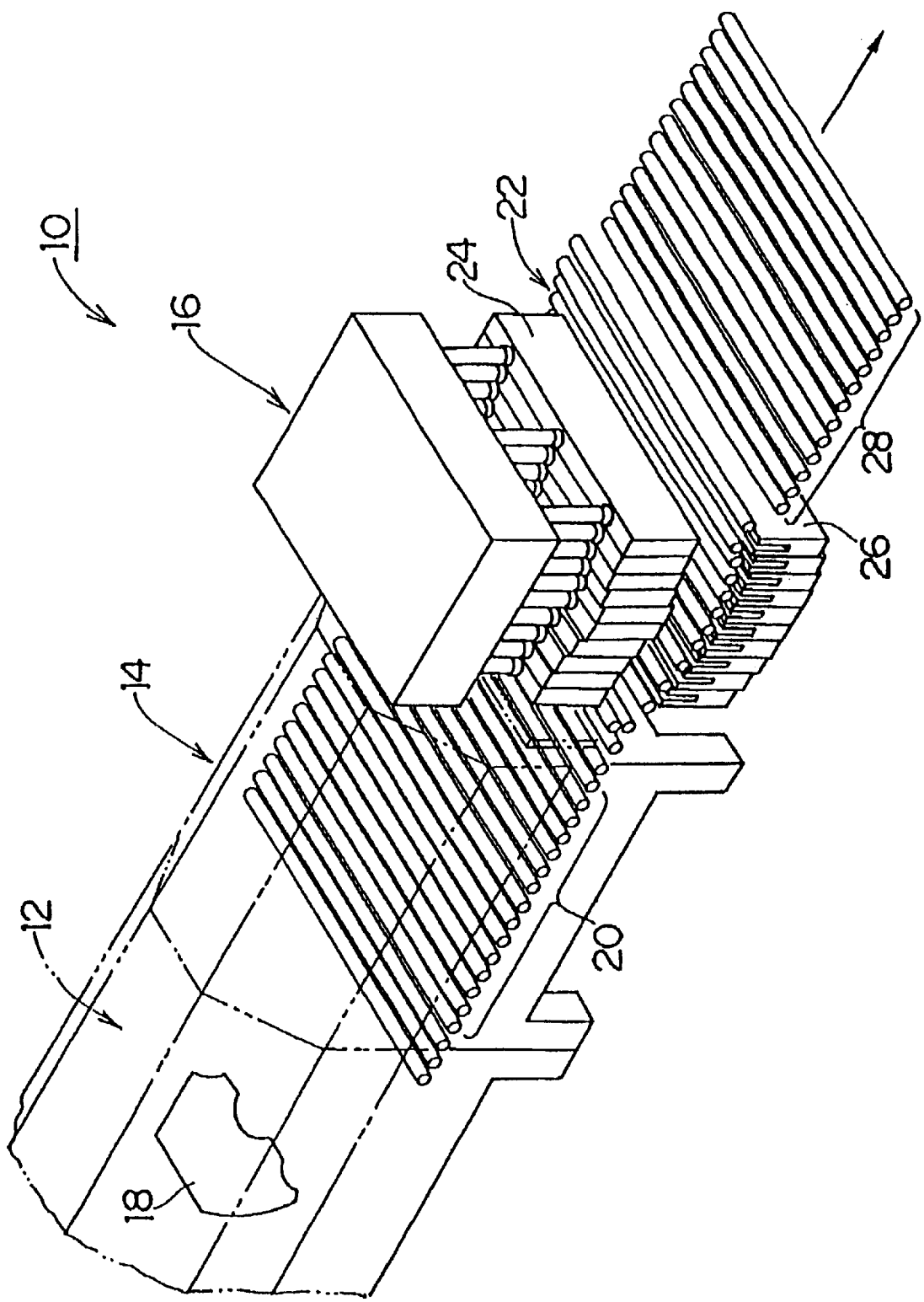
FIG. 1 is a perspective view showing the construction of the bend-shaping apparatus for a glass plate according to an embodiment of the present invention.

FIG. 1 is a perspective view showing the construction of a bend-shaping apparatus for a glass plate 10 according to an embodiment of the present invention. The shaping apparatus 10 comprises mainly a heating furnace 12, a shaping zone 14 and a cooling/tempering device 16.

First, a bend-shaping step for a glass plate 18 by the shaping apparatus 10 will be described. The glass plate 18 before bend-shaping is transferred into the heating furnace 12 by means of a roller conveyor (not shown) after the position of transfer has been determined at an inlet of the heating furnace 12. The glass plate 18 is heated by heaters in the heating furnace 12 during the transfer in the heating furnace 12, and is heated to a bend-shaping temperature (about 600–700° C.) at a downstream side in the heating furnace 12. The glass plate 18 heated to said temperature is transferred into the shaping zone 14 located at a downstream side in the heating furnace 12 by means of a roller conveyor 20 for bend-shaping.

While the glass plate 18 is transferred in the shaping zone 14, it is bend-shaped to have a predetermined curvature by bend-shaping operations of the roller conveyor 20. The bend-shaped glass plate 18 is transferred from an outlet of the shaping zone 14 to a cooling/tempering device 16 by means of a roller conveyor 22 for the cooling/tempering device 16 to be cooled and tempered. The cooling/tempering device 16 is provided with upper blowing heads 24 and lower blowing heads 26 which are disposed so as to interpose the roller conveyor 22 therebetween, and the glass plate 18 is cooled and tempered by air directed to the glass plate 18 through these blowing heads 24, 26. Cooling performance of the cooling/tempering device 16 is appropriately determined depending on a thickness of the glass plate 18. The glass plate 18 cooled and tempered is transferred from the outlet of the cooling/tempering device 16 toward an inspecting device (not shown) in the next step by means of a roller conveyor 28. The above-mentioned is a flow of the shaping step of the glass plate 18, as a single sheet, in the shaping apparatus 10.

Figure 2:
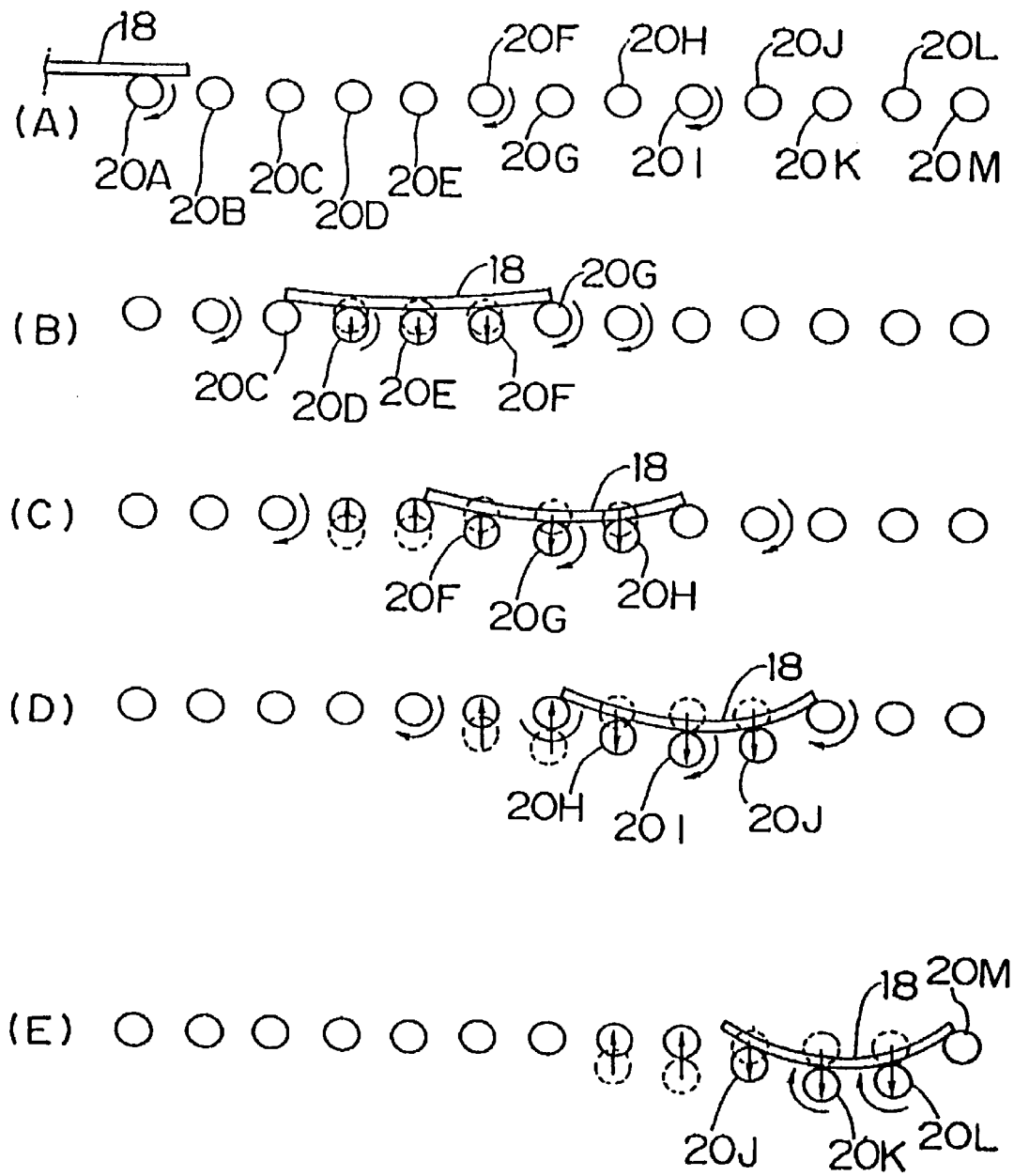
FIG. 2 is a transition diagram showing operations of bending a glass plate with a plurality of rollers arranged in a shaping zone.
Figure 3:
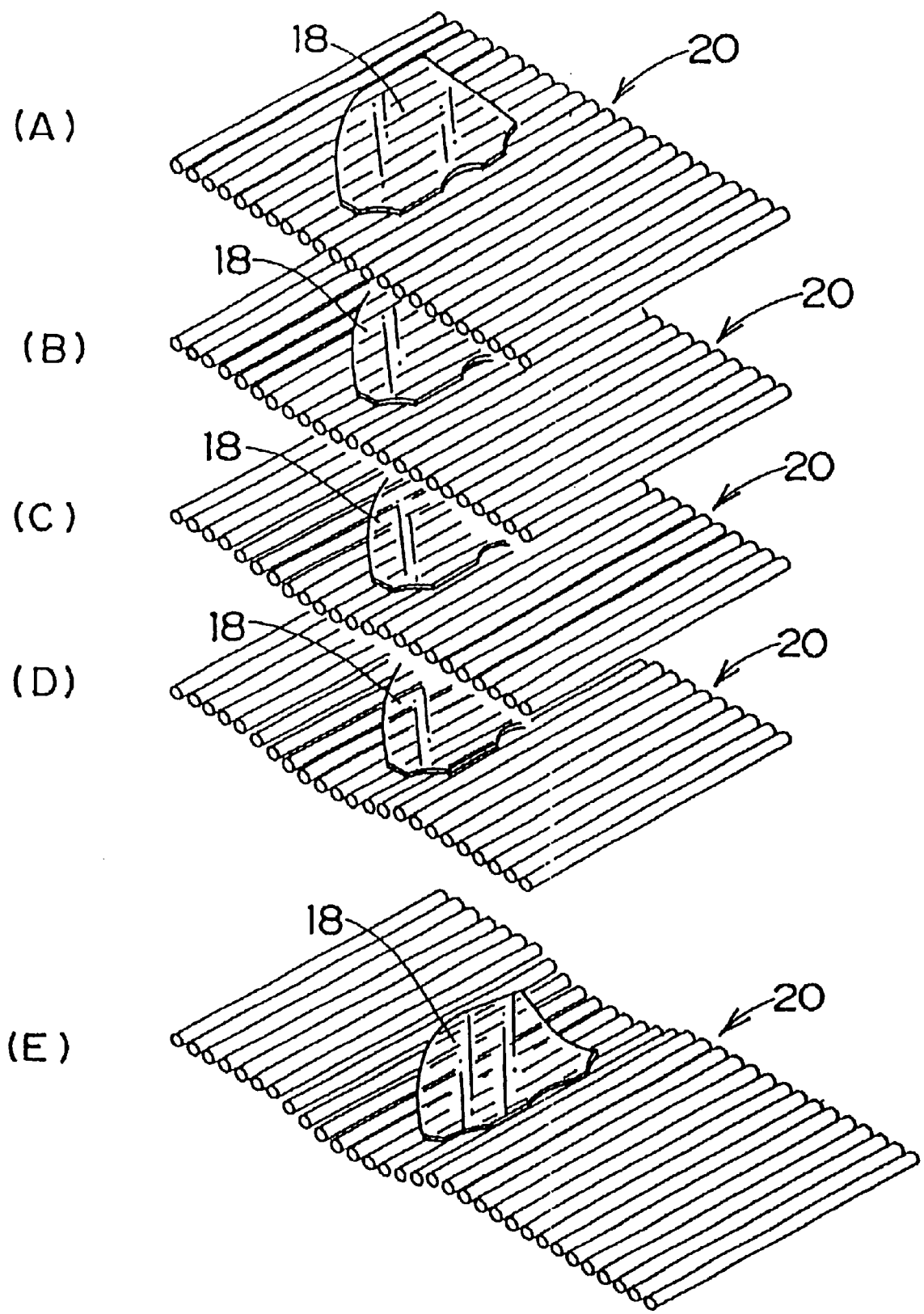
FIG. 3 is a perspective view corresponding to the transition diagram shown in FIG. 2.

Description will be made as to the roller conveyor 20 of the shaping zone 14 with reference to FIGS. 1–3. The roller conveyor 20 is constituted by a plurality of straight rollers (13 rollers 20A–20M (FIG. 2) in this embodiment) which are arranged in a horizontal state in a transferring direction of the glass plate, the rollers being in parallel to each other. The glass plate 18 is transferred with the rotation of the rollers 20A–20M along a transferring plane formed by these rollers 20A–20M.

The rollers 20A–20M are respectively driven to rotate independently by each rotating-driving means, and are moved vertically independently by means of each vertical direction driving means. The rotating/driving means and the vertical direction driving means are controlled by, for example, a motion controller. Alternatively, NC control can be performed by inputting various data to a personal computer.

Figure 4:
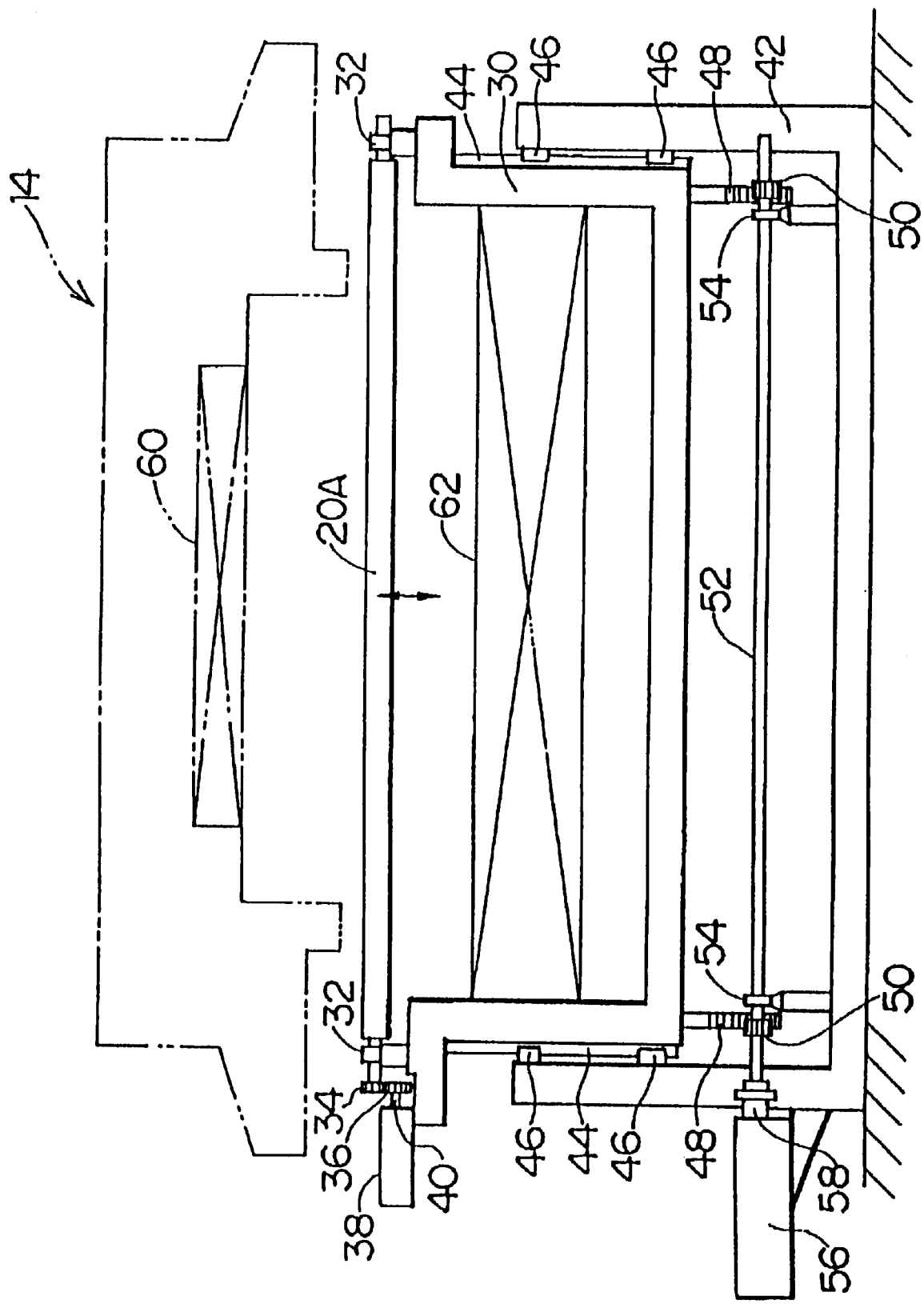
FIG. 4 is a diagram showing the constructions of a roller-rotating/driving means and a vertical direction driving means.

FIG. 4 is a structural diagram showing a rotating/driving means and a vertical direction driving means for each of the rollers 20A–20M. Since these rotating/driving means or these vertical direction driving means for each of the rollers 20A–20M have the same structure, description of only the structure of ones for a roller 20A is made for convenience with reference to FIG. 4, and description of the other structures for other rollers 20B–20M is omitted.

The roller 20A is, at its both ends, supported rotatably through bearings 32, 32 by a moving frame 30 having a U-shape. A spindle 40 of a servomotor 38 is connected through gear wheels 34, 36 to a left end portion of the roller 20A in FIG. 4. By driving the servomotor 38, the roller 20A is rotated at a predetermined angular speed. The above-mentioned is the structure of the rotating/driving means.

On the other hand, the moving frame 30 is, at its both sides, supported in a manner of moving vertically by a fixed frame 42 through a LM (linearly moving) guide. The LM guide has guide rails 44 which are arranged in a vertical direction at a side of the moving frame 30, and guide blocks 46 at a side of the fixed frame 42 are engaged with the guide rails 44.

Racks 48, 48 are projected downward at both end portions in a lower portion of the moving frame 30, and pinions 50, 50 are meshed with the racks 48, 48. The pinions 50, 50 are fixed to a horizontally arranged rotating shaft 52. The rotating shaft 52 has both ends supported by bearings 54, 54 and has a left end portion in FIG. 4 which is connected to a spindle 58 of a servomotor 56. When the rotating shaft 52 is rotated by the servomotor 56, a rotating motion is changed to a linear motion by the function of a pinion 50 and a rack 48 whereby the moving frame 30 (i.e., the roller 20A) is moved vertically. Thus, the construction of the vertical direction driving means has been mentioned. In FIG. 4, reference numerals 60, 62 designate heaters provided in the shaping zone 14.

The above-mentioned rotating/driving means and the vertical direction driving means are provided on all the other rollers 20B–20M, and servomotors 38, 56 for these means are controlled by the above-mentioned motion controller.

The motion controller will be described. When a model of a glass plate 18 is inputted through an external input means, the motion controller prepares angular speed controlling data and vertical movement controlling data for the rollers 20A–20M, which correspond to a curvature of the glass plate 18. Then, the motion controller controls the servomotors 38 based on the angular speed controlling data and controls the servomotors 56 based on the vertical movement controlling data. Namely, the motion controller performs multiple axis control for the rollers 20A–20M so that the glass plate 18 is bend-shaped to have a predetermined curvature during the transfer by the rollers 20A–20M.

Bending operations for the glass plate based on the multiple axis control for the rollers 20A–20M will be described with reference to FIG. 2. The basic vertical movements of the rollers are sequential descending and ascending movements in the order of rollers 20A→20M with the transfer of the glass plate. In the description made below, a character in brackets correspond to the same character in brackets in FIG. 2.

When a heated glass plate 18 reaches on the roller 20A at an inlet side, all the rollers 20A–20M are at highest positions (initial position) (A), and a transferring plane formed by the rollers 20A–20M is horizontal (corresponding to FIG. 3(A)). When the glass plate 18 is further transferred, rollers 20B, 20C are descended.

When the glass plate 18 is transferred, rollers 20D–20F are descended whereby a transferring plane formed by the rollers 20D–20F, among transferring planes formed by the rollers 20A–20M, is changed to a curved shape having a larger radius of curvature thereby having a gentle downward convex shape (B). Along with this, the glass plate 18 deflects downward along the curved plane formed by the rollers 20D–20F due to the deadweight of the glass plate 18 while it is passed through the rollers 20D–20F (corresponding to FIG. 3(B)). The curved plane formed by the rollers 20D–20F forms a shape curved in the transferring direction of the glass plate. In the description as described below, curved planes by each roller are such shapes curved in the transferring direction of the glass plate, and "a shape curved in the transferring direction" is omitted from description.

During the descending of the rollers 20D–20F, a transferring rate $V_x$ on a horizontal component of the glass plate 18 depends on positions in a vertical direction of the rollers 20D–20F. In this case, when angular speeds (rotating speeds) ω of the rollers 20D–20F are constant, $V_x$ of a roller 20E at a lower position is higher than $V_x$ of rollers 20D, 20F at upper positions. When such imbalance phenomenon of speed takes place, there causes slippage between the rollers 20D–20F and the glass plate 18 so that a flaw is apt to be produced in the glass plate 18.

Figure 5:
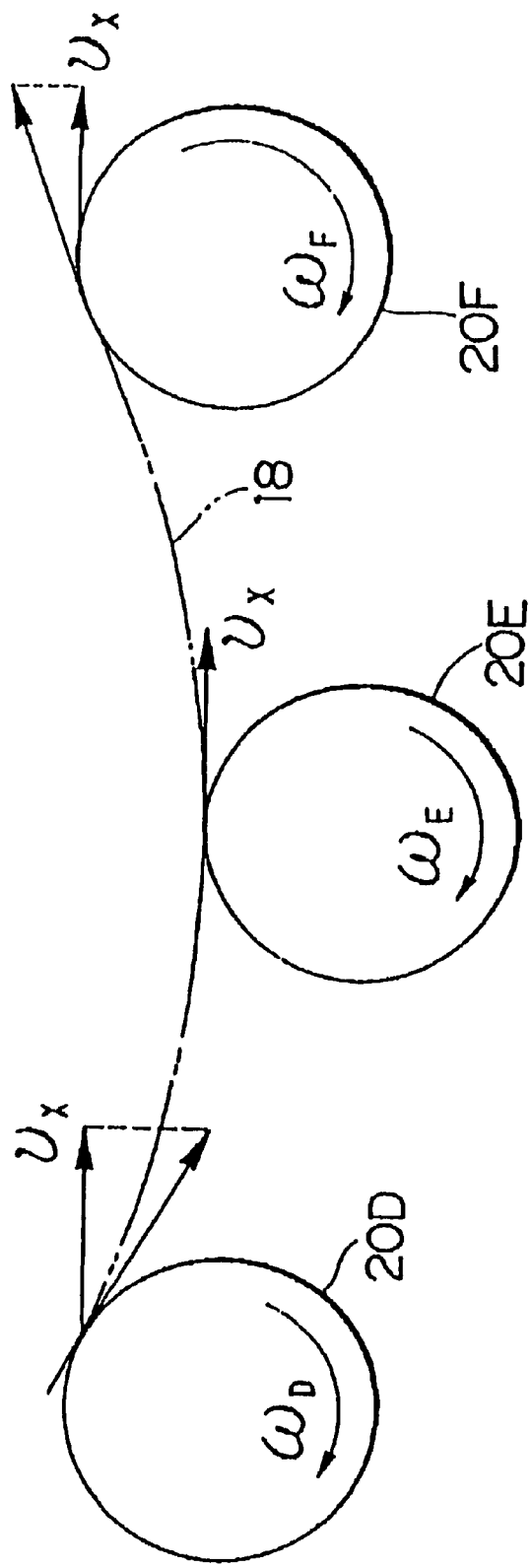
FIG. 5 is a diagram showing a transferring rate of a horizontal component of a glass plate.

Accordingly, the motion controller controls each servomotor 56 for the rollers 20D–20F so that transferring rates $V_x$ on a horizontal component of the glass plate 18 by the rollers 20D–20F are equal as shown in FIG. 5 (reference to FIG. 5). Namely, the motion controller controls angular speeds of the rollers 20D–20F to be $\omega_D > \omega_E < \omega_F$ wherein positions in the vertical direction of the rollers 20D–20F are used as parameters. With such measures, the above-mentioned disadvantage is eliminated and there is little possibility that a flaw is resulted in the glass plate 18 due to the slippage.

When the glass plate 18 is further transferred, rollers 20F–20H are descended slightly further than the rollers 20D–20F whereby a transferring plane formed by the rollers 20F–20H is deformed to be a curved shape which is smaller in radius of curvature than that of the former curved plane (being largely bent) (C). Thus, the glass plate 18 is further deflected downward along the curved plane by the rollers 20F–20H while the glass plate is passed on the rollers 20F–20H whereby it is deformed to have a shape along the curved plane (corresponding to FIG. 3(C)). When the glass plate 18 is continuously transferred, the position of the roller 20D or the roller 20E is higher than the position in a state of FIG. 3(B) and lower than the position in a state of FIG. 3(C).

When the glass plate 18 comes to a position at substantially intermediate in the transferring path, rollers 20H–20J are descended slightly further the former rollers 20F–20H whereby a transferring plane formed by the rollers 20H–20J is deformed to have a shape having a smaller radius of curvature than that of the former curved plane (D). Thus, the glass plate 18 is further deflected downward along the curved plane formed by the rollers 20H–20J when it is passed on the rollers 20H–20J to thereby have a shape along the curved plane (corresponding to FIG. 3(D)).

Finally, when the glass plate 18 reaches a downstream side in the transferring path, rollers 20J–20L are descended slightly further the former rollers 20H–20J whereby a transferring plane formed by the rollers 20J–20L is deformed to have a curved shape having a curvature which corresponds to a predetermined curvature of the glass plate 18 finally obtainable (E). Accordingly, when the glass plate 18 is passed on the rollers 20J–20L, the shape of the glass plate is deformed so as to be along the curved plane whereby the glass plate is bend-shaped to have a predetermined curvature (corresponding to FIG. 3(E)). Thus, the above-mentioned is the bend-shaping of the glass plate 18 by means of the rollers 20A–20M.

Accordingly, each of the rollers in the shaping zone 14 performs one cycle of descending/ascending motion during the transfer of a single glass plate 18. With this motion, a wave plane of downward convex shape is formed by a group of rollers at which the glass plate 18 is positioned, and the wave plane is shifted with the transfer of the glass plate 18. A front edge in the transferring direction and a rear edge in the transferring direction of the glass plate 18 are maintained at the transferring level, and an intermediate portion of the glass plate 18 falls downward from the transferring level depending on a descending position of each roller. Thus, the glass plate 18 is bend-shaped in the transferring direction while it is transferred by each of the rollers. In this case, since the front edge in the transferring direction and the rear edge in the transferring direction of the glass plate 18 are maintained at the transferring level, the transferring direction of the glass plate can be said to be a direction in parallel to the transferring level.

Since the glass plate 18 is bent largely as it goes to a downstream side in the shaping zone 14, the amplitude of the wave plane becomes larger toward the downstream side. Namely, the amplitude of the descending/ascending motion of each roller becomes larger toward a downstream in the shaping zone 14.

The bend-shaping method and bend-shaping apparatus for a glass plate according to the present invention are used for bend-shaping a large quantity of glass plates. Namely, a large quantity of glass plates can be bend-shaped by transferring continuously one by one a plurality of glass plates. Accordingly, each roller in the shaping zone 14 performs a vertical oscillation repeatedly so as to bend-shape successively transferred glass plates. Therefore, a plurality of waves of downward convex shape are successively shifted from a side of the heating furnace 12 to the cooling/tempering device 16 in the shaping zone 14.

The amplitude of the wave is increased from a side of the heating furnace 12 toward cooling/tempering device 16.

Thus, according to this embodiment, straight rollers 20A–20M are used as a plurality of rollers, and the glass plate 18 is bend-shaped by causing a vertical movement of the rollers 20A–20M in association with the transfer of the glass plate 18. Accordingly, an exchanging work for rollers, which was required in the conventional technique, can be omitted. Further, a job change time can substantially be eliminated since a glass plate of another model can be shaped by changing only the vertical movement controlling data on the rollers.

Further, in this embodiment, the cooling/tempering device 16 is provided at a downstream side of the shaping zone 14. The cooling/tempering device 16 rapidly cools the glass plate after having been bend-shaped to obtain the curved glass plate 18 which has undergone a tempering treatment.

Further, it is preferable to change the curvature of the transferring plane based on data on the shape of the glass plate 18 to be obtained. Particularly, since the shape of a glass plate for an automobile window is previously obtained as CAD data, the CAD data can be linked with the above-mentioned motion controller so that a change of the curvature can easily be conducted.

It is preferable that the roller conveyor 22 provided at a side of the cooling/tempering device 16 as well as the roller conveyor 20 provided at a side of the shaping zone 14 is provided with a rotation driving means and a vertical direction driving means which are controlled by a separate or the same motion controller. In this case, a vertical position of each roller in the roller conveyor 22 can be changed so that a curvature of the transferring plane by the roller conveyor 22 is made equal to a curvature of the glass plate 18.

Further, it is preferable that upper blowing heads 24 and lower blowing heads 26 of the cooling/tempering device 16 are determined in correspondence with the number of rollers in the roller conveyor 22. In this case, the upper blowing heads 24 and the lower blowing heads 26 can be moved in a vertical direction so that distances to the glass plate 18 are always constant in association with upward movements of the rollers corresponding thereto. Thus, the glass plate 18 having a uniform strength over the entire faces can be obtained.

In the above-mentioned embodiment, each of the rollers undergoes a descending→ascending movement to form a wave plane of downward convex shape, the wave plane being shifted. On the contrary, it is possible that each of the rollers undergoes a ascending→descending movement to form a wave plane of upward convex shape, the wave plane being shifted. In this case, front and rear edges in a transferring direction of a glass plate, but not a central portion of a glass plate, fall due to the deadweight of the glass plate. From the standpoint that the transfer of the glass plate should be conducted smoothly, it is preferable to cause a descending/ascending movement on each of the rollers to shift the wave plane of downward convex shape.

In the embodiment shown in FIG. 1, the shaping zone 14 is provided in an enclosure formed by the heating furnace 12. Namely, the shaping zone 14 is provided in and at a downstream side of the heating furnace 12. The bend-shaping apparatus for a glass plate according to the present invention includes that (i) the shaping zone is provided in the heating furnace, (ii) it is provided out of the heating furnace, and (iii) a part of the shaping zone is provided out of the heating furnace. With respect to the position of the shaping zone, the above-mentioned options (i)–(iii) can suitably be selected depending on dimensions and a shape of the glass plate to be bent.

First, a relation between a thickness of a glass plate and a position of the shaping zone will be described. A tempering treatment after the glass plate has been bend-shaped is influenced by a thickness of the glass plate. Namely, a compression stress is produced in surfaces and a tensile stress is produced in the inside of the glass plate after the tempering treatment. These residue stresses are derived from a temperature difference between the surfaces of the glass plate and the inside of the glass plate, which is resulted from the rapidly cooling of heated glass plate. Since it is difficult to obtain such temperature difference in a case of a glass plate having a smaller thickness, it is necessary to increase cooling performance at the time of rapidly cooling when a glass plate having a smaller thickness is to be tempered. As one of measures to increase the cooling performance, there is a way of increasing a blowing pressure or an air quantity of cooling air. Alternatively, there is way of increasing a temperature of glass plate at the time of rapidly cooling.

In the case of (i), a glass plate after having been bend-shaped can immediately be transferred into the cooling/tempering device because the glass plate can be bend-shaped in the heating furnace. Accordingly, the glass plate can be transferred into the cooling/tempering device without causing a reduction of the temperature of the glass plate. Accordingly, the arrangement of the shaping zone in (i) is advantageous when the glass plate having a smaller thickness is bend-shaped and tempered.

In the following, a relation between a curved shape of the glass plate and a position of the shaping zone will be described. In a case of bend-shaping into a complexly curved shape, means for bend-shaping the glass plate in a direction perpendicular to the transferring direction is provided in the shaping zone. If this means is provided in the heating furnace, it is difficult to maintain a closed space in the heating furnace. This creates such a disadvantage that temperature in the heating furnace can not be maintained to a predetermined temperature. On the other hand, when this means is provided outside the heating furnace, stabilization of temperature in the heating furnace can be realized. Accordingly, the arrangement of the shaping zone in (ii) is advantageous in a case of bend-shaping the glass plate to have a complexly curved shape.

For a bend-shaping/tempering treatment for bend-shaping a glass plate having a smaller thickness to have a complexly curved shape, (iii), as an intermediate way of (i) and (ii), is advantageous. Further, the arrangement of the bend-shaping zone in (iii) is preferred in the following point, in addition to the advantage in the intermediate way. Namely, for a demand of small quantity•large variety of products in automobile industries, there is a need for bend-shaping glass plates of many models in a single glass-plate bend-shaping apparatus. There are large variety of thickness and shape of glass plates depending on models. Accordingly, a single bend-shaping apparatus having the ability of shaping glass plates having various thicknesses and various shapes is advantageous. The arrangement in (iii) provides a shaping zone arrangement applicable to such requirement for small quantity•large variety of products.

There are various shapes on glass plates for automobile windows. For example, there are a simply curved shape, a combined curved shape, a complexly curved shape and so on. In bend-shaping glass plates having these shapes, it is preferable to add some mechanisms described below to the bend-shaping apparatus for a glass plate concerning the above-mentioned embodiment. In the following, description will be made as to some of these mechanisms.

Figure 6:
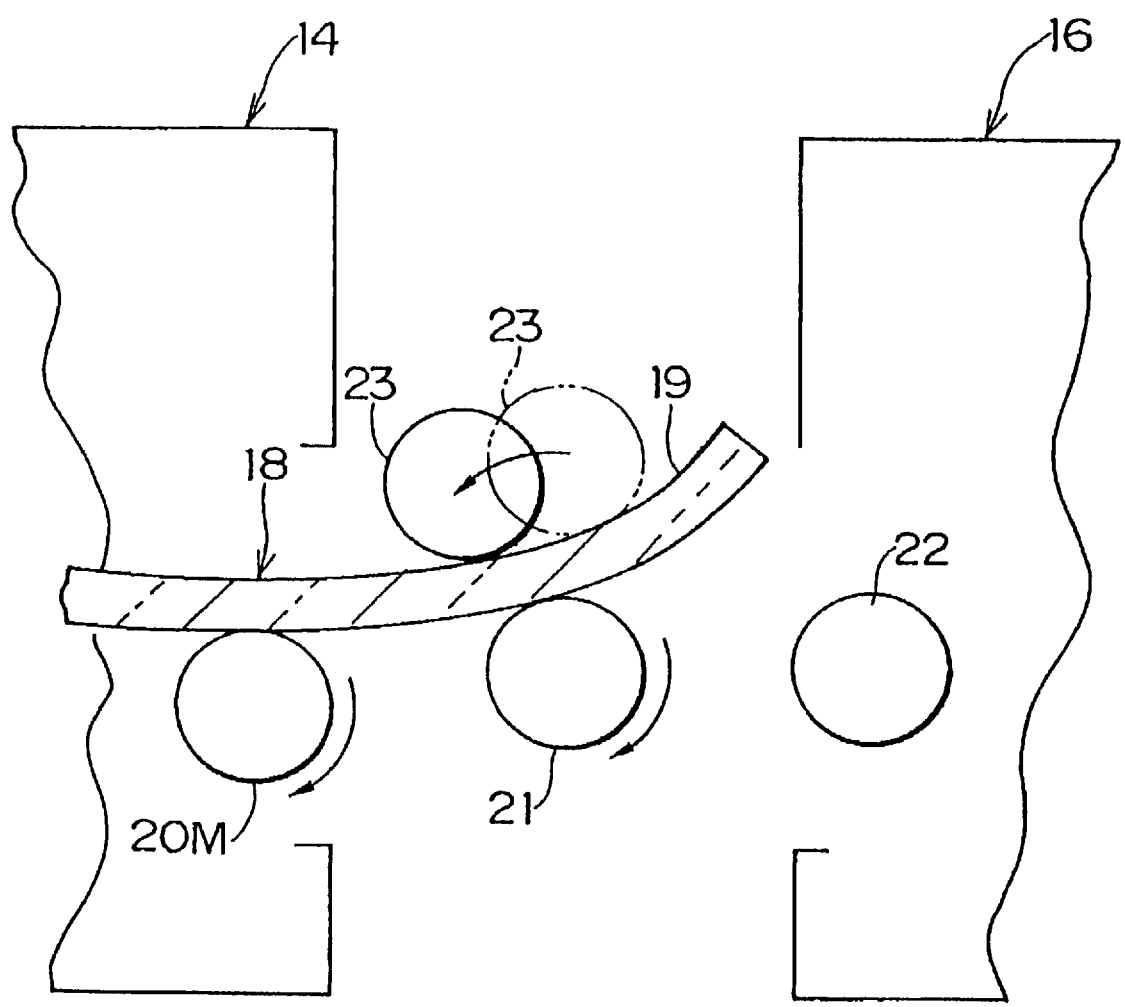
FIG. 6 is a side view for explaining operations of a forcibly bending nip roller located between a shaping zone and a cooling device.

For example, there is a case of using a glass plate for an automobile window, which has a smaller radius of curvature at positions in the vicinity of left and right sides and a larger radius of curvature at a central portion (a glass plate having a combined curved shape). In this case, nip rollers 21, 23 are arranged between the shaping zone 14 and the cooling/tempering device 16 as shown in FIG. 6. When the nip rollers 21, 23 nip a position 19 in the vicinity of a left or right side of the glass plate 18, a nip roller 23 at an upper side is rotated counter-clockwise along a locus of circular arc in FIG. 6, whereby left and right sides of the glass plate 18 are forcibly bent into desires shapes (shapes having a smaller radius of curvature) by means of the nip rollers 21, 23. The bend-shaping apparatus 10 with the nip rollers 21, 23 can be used as a bend-shaping apparatus for a glass plate having a combined curved shape.

An example that the nip rollers 21, 23 can be applied is described below. When a glass plate is bend-shaped in the transferring direction, a central region of side portions which are in parallel to the transferring direction of the glass plate is sometimes curved in a direction perpendicular to the transferring direction. Such phenomenon is apt to appear when the glass plate is bend-shaped at a high speed. In order to correct such curving of the glass plate, a sandwich roller 64 (FIG. 7) is preferably used, which is described below.

Figure 7:
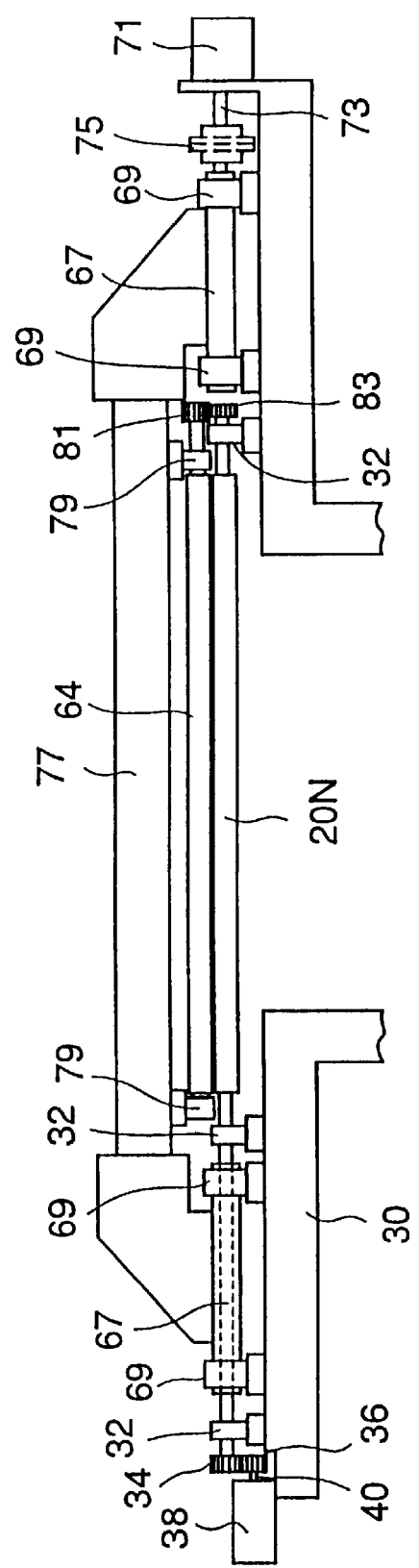
FIG. 7 is a front view showing the construction of a sandwich roller.

FIG. 7 is a front view showing the structure of the sandwich roller 64 arranged above a transferring roller 20N which is disposed at an end portion of the shaping zone 14. Namely, the sandwich roller 65 for correcting the curving of the glass plate is provided at an end portion of the shaping zone 14 in FIG. 1.

The transferring roller 20N is rotatably supported on the moving frame 30 by means of bearings 32, 32, 32. A driven gear wheel 34 is fixed to an end (a left end in FIG. 7) of the transferring roller 20N, and the driven gear wheel 34 is meshed with a driving gear wheel 36. The driving gear wheel 36 is attached to an output shaft 40 of a servomotor 38. The transferring roller 20N is rotated at a predetermined angular speed by driving the servomotor 38. The above-mentioned mechanism is the same as the mechanism for the transferring roller 20A described with reference to FIG. 4.

A pair of oscillating tubes 67, 67 are supported rotatably on the moving frame 30 by means of bearings 69, 69 . . . . The pair of oscillating tubes 67, 67 are arranged on the same axis as that of the transferring roller 20N. The rotating shaft of the transferring roller 20N is inserted into one of the oscillating tubes 67 (at a left side in FIG. 7). An output shaft 73 of a servomotor 71 for oscillating/driving is connected to the other oscillating tube 67 by means of a coupling 75.

The pair of oscillating tubes 67, 67 are mutually connected by means of a connection bar 77. The sandwich roller 64 is rotatably supported to the connection bar 77 by means of bearings 79, 79. Thus, the sandwich roller 64 is provided so as to be capable of oscillating with respect to the axial center as, the center, of the transferring roller 20N.

An end (at a right end in FIG. 7) of the sandwich roller 64 is attached with a gear wheel 81. The gear wheel 81 is meshed with a gear wheel 83 firmly connected to an end (at a right end in FIG. 7) of the transferring roller 20N. Accordingly, when the transferring roller 20N is rotated, the rotation is transmitted to the sandwich roller 64 through the gear wheels 81, 83 whereby the sandwich roller 64 is rotated.

In the sandwich roller 64 constructed as described above, when the servomotor 38 for the transferring roller 20N is driven, it is rotated at a predetermined angular speed along with the transferring roller 20N. Then, when the servomotor 71 for oscillating/driving is driven, the transferring roller 20N is oscillated around its axial center as the center of oscillation. The glass plate 18 is transferred between the sandwich roller 64 and the transferring roller 20N.

The servomotor 71 for oscillating/driving the sandwich roller 64 is controlled by the motion controller in the same manner as the servomotor 38 as a rotation driving means.

Description will be made as to the motion controller. When data on a model of the glass plate 18 are inputted from an external input means to the motion controller, it produces angular speed controlling data and vertical movement controlling data for the transferring rollers 20A, 20B . . . and oscillation controlling data for the sandwich roller 64 so as to correspond to the curvatures of the model of the glass plate 18. Then, the servomotor 38 is controlled based on the angular speed controlling data and the servomotor 56 is controlled based on the vertical movement controlling data. Further, the servomotor 71 is controlled based on the oscillation controlling data. Namely, the motion controller performs multiaxial control on each of the transferring rollers 20A, 20B, . . . so that the glass plate 18 is bend-shaped to have desired curvatures during the transfer on the transferring rollers 20A, 20B, . The control for the transferring rollers 20A–20M and the bend-shaping operations for the glass plate 18 according to the vertical movement of the transferring rollers 20A–20M have already been described with reference to FIGS. 2 and 3.

Figure 8:
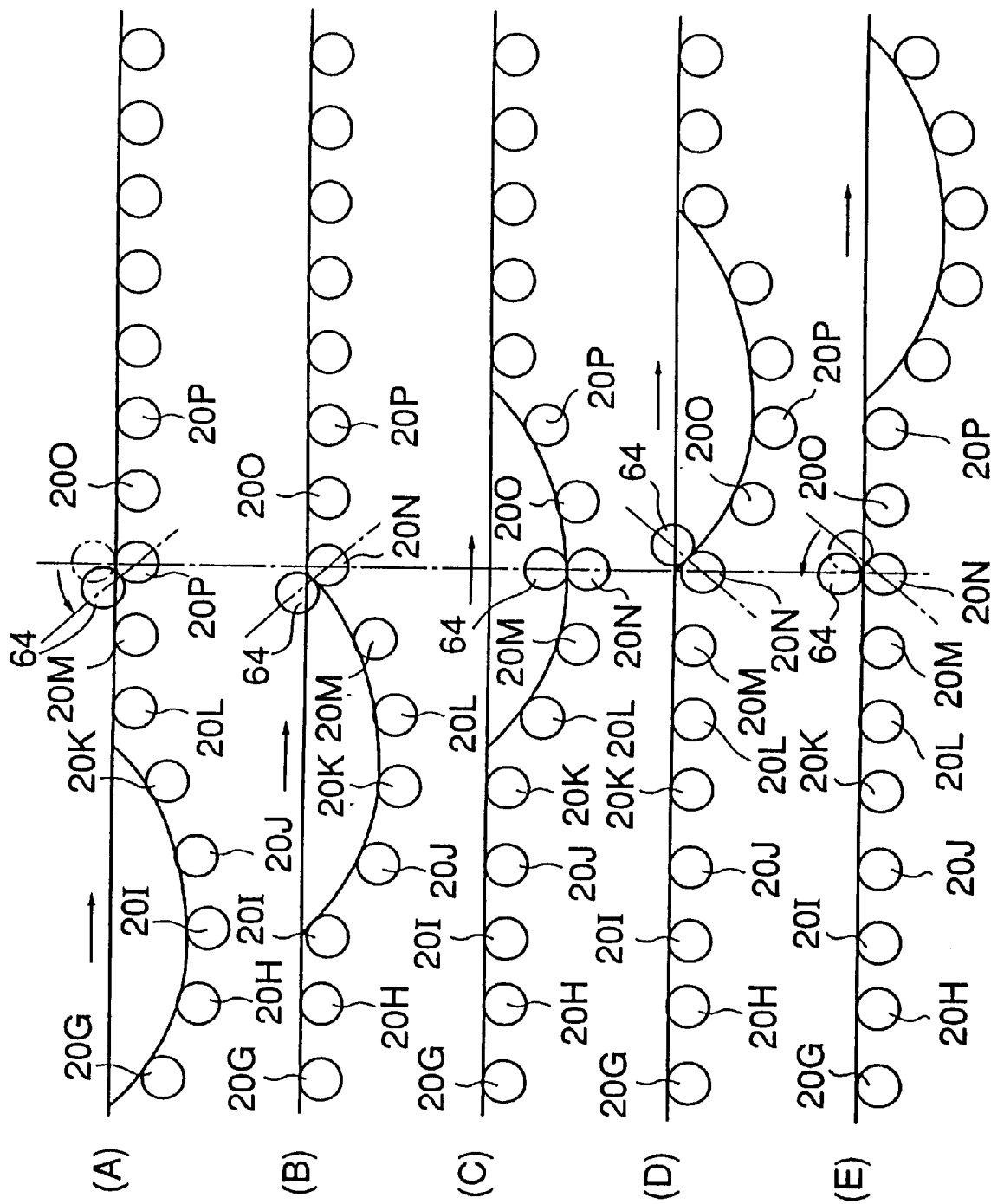
FIG. 8 is a transition diagram showing correcting operations for a glass plate by the sandwich roller.
Figure 10:
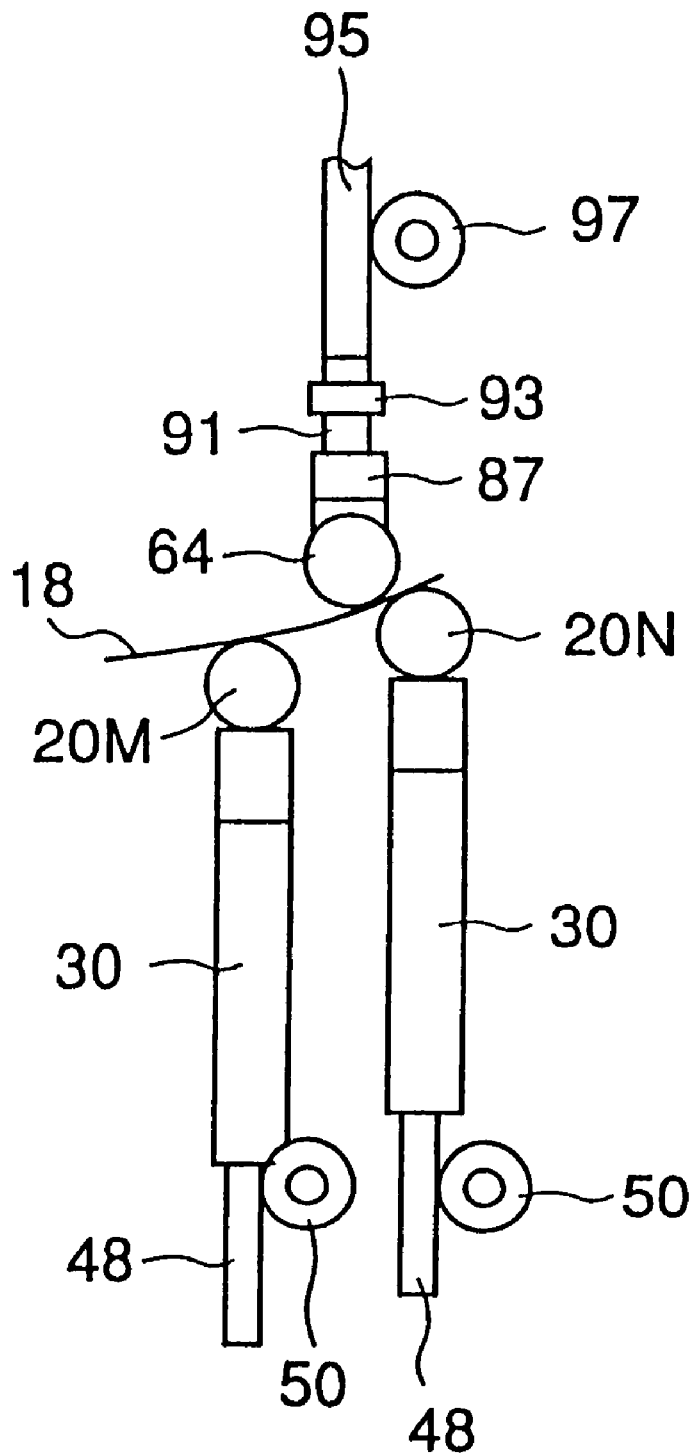
FIG. 10 is a side view of the construction of the sandwich roller.

It is effective to apply the sandwich roller 64 to the glass plate 18 bend-shaped while it reaches the transferring roller 20M wherein a deflection takes place in a side portion of the glass plate or a deflection may take place in that portion. Operations of the sandwich roller 64 will be described with reference to FIG. 8. In description, a character in brackets correspond to the same character in brackets shown in FIG. 8.

When the glass plate 18 is transferred to a position just before transferring roller 20N, the sandwich roller 64 is on standby with inclination at a predetermined angle (A). Namely, it is on standby with inclination at a predetermined angle so that the curved glass plate 18 is fed between the transferring roller 20N and the sandwich roller 64. At this moment, the sandwich roller 64 is on standby with inclination so that it is located in a direction of normal line to a curved plane of the glass plate 18.

A leading end of the glass plate 18 transferred to the transferring roller 20N is fed between the sandwich roller 64 and the transferring roller 20N (B). Then, the glass plate is transferred in a state that it is held between the sandwich roller 64 and the transferring roller 20N (C), (D).

At this moment, the transferring roller 20N transfers the glass plate 18 under a vertical movement so as to keep the shape of the desirably bend-shaped glass plate 18. On the other hand, the sandwich roller 64 undergoes a vertical movement in accompany with the vertical movement of the transferring roller 20N, and at the same time, it is inclined to a position that it is always located in a direction of normal line to the curved plane of the glass plate formed by the transferring rollers. Therefore, even in a case that a deflection takes place in a side portion of the glass plate 18, the deflection is compressed by the sandwich roller 64, and the glass plate 18 is corrected to a state without any deflection. Thus, the glass plate can be accurately bend-shaped without any deflection.

After the glass plate 18 has passed on the transferring roller 20N, the transferring roller N is returned to the original position, i.e., the highest position. Then, the sandwich roller 64 is returned to a position just above the transferring roller 20N (E).

As described above, the sandwich roller 64 is located in a direction of normal line to the curved plane formed by the transferring rollers, and the glass plate is held between the transferring roller 20N and the sandwich roller 64. Thus, the glass plate 18 can be bend-shaped accurately without the generation of a deflection in a side portion.

The sandwich roller 64 having the construction as shown in FIG. 7 can be used to bend-shape a glass plate having a combined curved shape as follows. Even in a case that the glass plate 18 is bend-shaped to have a predetermined curvature with use of the sandwich roller 64, the glass plate 18 is bend-shaped to have a predetermined curvature in the transferring direction with use of the above-mentioned transferring rollers 20A–20L. Namely, the sandwich roller 64 performs further a predetermined bend-shaping to the glass plate 18 which has been bend-shaped to have a predetermined curvature by means of the transferring rollers 20A–20L. In the following, description will be made as to a case that the glass plate 18 which has been bend-shaped to have a predetermined curvature by means of the transferring rollers 20A–20L, is bend-shaped with the sandwich roller 64.

The sandwich roller 64 is inclined at a predetermined angle from a position along a direction of normal line to a direction for bend-shaping to thereby give a predetermined bending load to the glass plate 18. Thus, a portion of the glass plate 18 to which a predetermined bending load is given is bend-shaped. Namely, the sandwich roller 64 is usually positioned in a direction of normal line to the transferring plane (FIG. 9(A)). When the glass plate 18 is to be bend-shaped, the inclination to a predetermined angle a is carried out from the direction of normal line to a direction for bend-shaping (FIG. 9(B)). Thus, a predetermined bending load is given, due to the sandwich roller 64 as a fulcrum, to the glass plate 18 located between the transferring roller 20M and the transferring roller 20N. As a result, the curved glass plate 18 in which curvatures are different depending on positions in the transferring direction, can be obtained.

The sandwich roller 64 can be oscillated with an optional angle. Accordingly, when the glass plate 18 is bend-shaped to have a smaller radius of curvature, the sandwich roller 64 should be inclined at a larger inclination angle, whereby a large bending load is applied to the glass plate 18 and the glass plate 18 can be bend-shaped to have a smaller radius of curvature.

Since the sandwich roller 64 can be freely oscillated, an optional portion of the glass plate 18 can be bend-shaped in the transferring direction by causing a selective inclination. Thus, use of the sandwich roller 64 allows to bend-shape an optional portion of the glass plate 18 to follow an optional curvature. Further, since the glass plate 18 is held between the sandwich roller 64 and the transferring rollers 20M and 20N, a deflection produced in a side portion of the glass plate 18 can be corrected. Thus, the glass plate 18 can be bend-shaped further accurately.

The position of the sandwich roller 64 to be disposed is not limited to the position above the transferring roller 20N. For example, it may be located at an intermediate position of the shaping zone 14, or it may be located at an end position of the transferring path. Further, the number of the sandwich roller 64 to be disposed is not be limited to a single, but a plurality of sandwich rollers may be disposed.

The sandwich roller 64 is not limited to being provided in a manner of freely oscillating with respect to the axial center of the transferring roller 20N. For example, the sandwich roller 64 may be provided in a manner of freely movable in a vertical direction to the transferring plane for the glass plate 18. Such construction is as follows.

Figure 11:
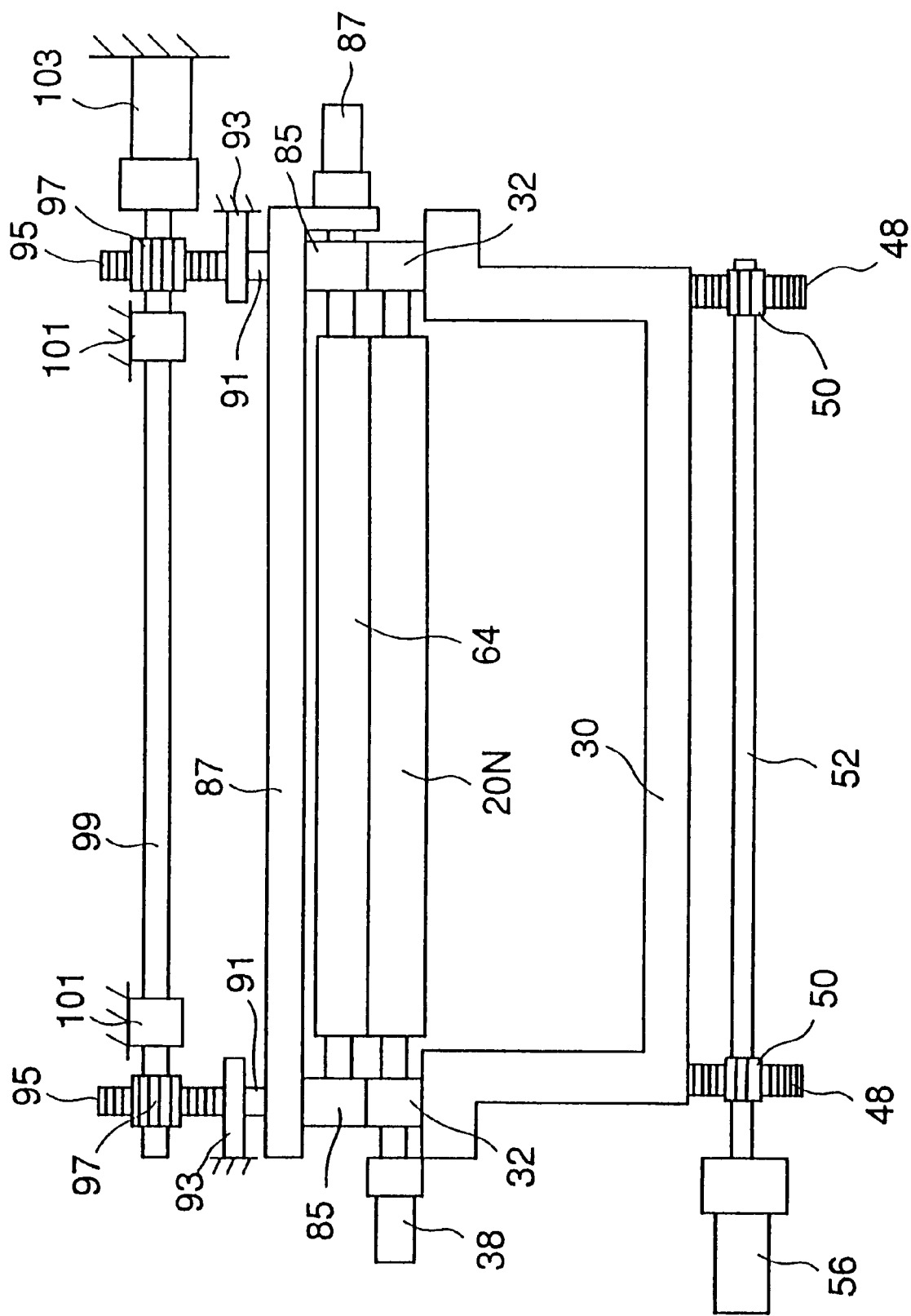
FIG. 11 is a front view showing the construction of the sandwich roller.

The sandwich roller 64 is disposed above the transferring plane and between the transferring roller 20M and the transferring roller 20N, and is supported rotatably by a support frame 87 by means of bearings 85, 85. An output shaft of a servomotor 89 is connected to an end (a right end in FIG. 11) of the sandwich roller 64.

A pair of guide rods 91, 91 are set up in a vertical direction on upper ends of the support frame 87. These guide rods 91, 91 are supported in a manner of freely sliding by guide blocks 93, 93 which are respectively attached to the frame main body of the apparatus (not shown).

Racks 95, 95 are attached in a vertical state to upper ends of the guide rods 91, 91. Pinions 97, 97 are respectively meshed with the racks 95, 95, and the pinions 97, 97 are fixed to a rotating shaft 99. The rotating shaft 99 is rotatably supported by bearings 101, 101, which are attached to the frame main body of the apparatus (not shown). An output shaft of a servomotor 102 is connected to an end (a right end in FIG. 11) of the rotating shaft 99, and the servomotor 102 is attached to the frame main body of the apparatus (not shown).

As described above, the mechanism for rotating and moving vertically the sandwich roller 64 is provided. According to this mechanism, the sandwich roller 64 is rotated by driving the servomotor 89. Further, the sandwich roller 64 is moved vertically by driving the servomotor 102. Namely, when the servomotor 102 is driven, the rotating shaft 99 is rotated, and a rotating movement of it is converted into a linear movement by the action of the pinion 97 and the rack 95 to move the support frame 87 in a vertical direction. The vertical movement of the support frame 87 causes a vertical movement of the sandwich roller 64.

When the sandwich roller 64 constructed as described above is pressed to the glass plate 18 between the transferring roller 20M and the transferring roller 20N while it is rotated at a predetermined rotating speed, a predetermined bending load is given to the glass plate 18. Thus, in addition to the bend-shaping of the glass plate in the transferring direction by means of the rollers 20A–20L, a predetermined portion of the glass plate can be bend-shaped in the same direction to have a predetermined curvature.

The following method can be considered as to the bend-shaping method for bending a glass plate to have a combined curved shape. Namely, in the bend-shaping operations for the glass plate explained with reference to FIG. 2, the curved plane bent in the transferring direction which is formed by the rollers 20A–20M is a curved plane having a single radius of curvature.

Accordingly, the glass plate 18 to be bend-shaped is bent to have a curved plane having a single radius of curvature.

On the other hand, as described below, by forming the transferring plane formed by the rollers 20A–20M to have a curved plane which comprises a plurality of radius of curvatures, the glass plate 18 can be bend-shaped to have a curved plane curved in the transferring direction, which comprises a plurality of radius of curvatures. The curved plane in this case is a curved plane curved in the transferring direction. In the following description, "a curved plane curved in the transferring direction" is omitted.

Figure 12:
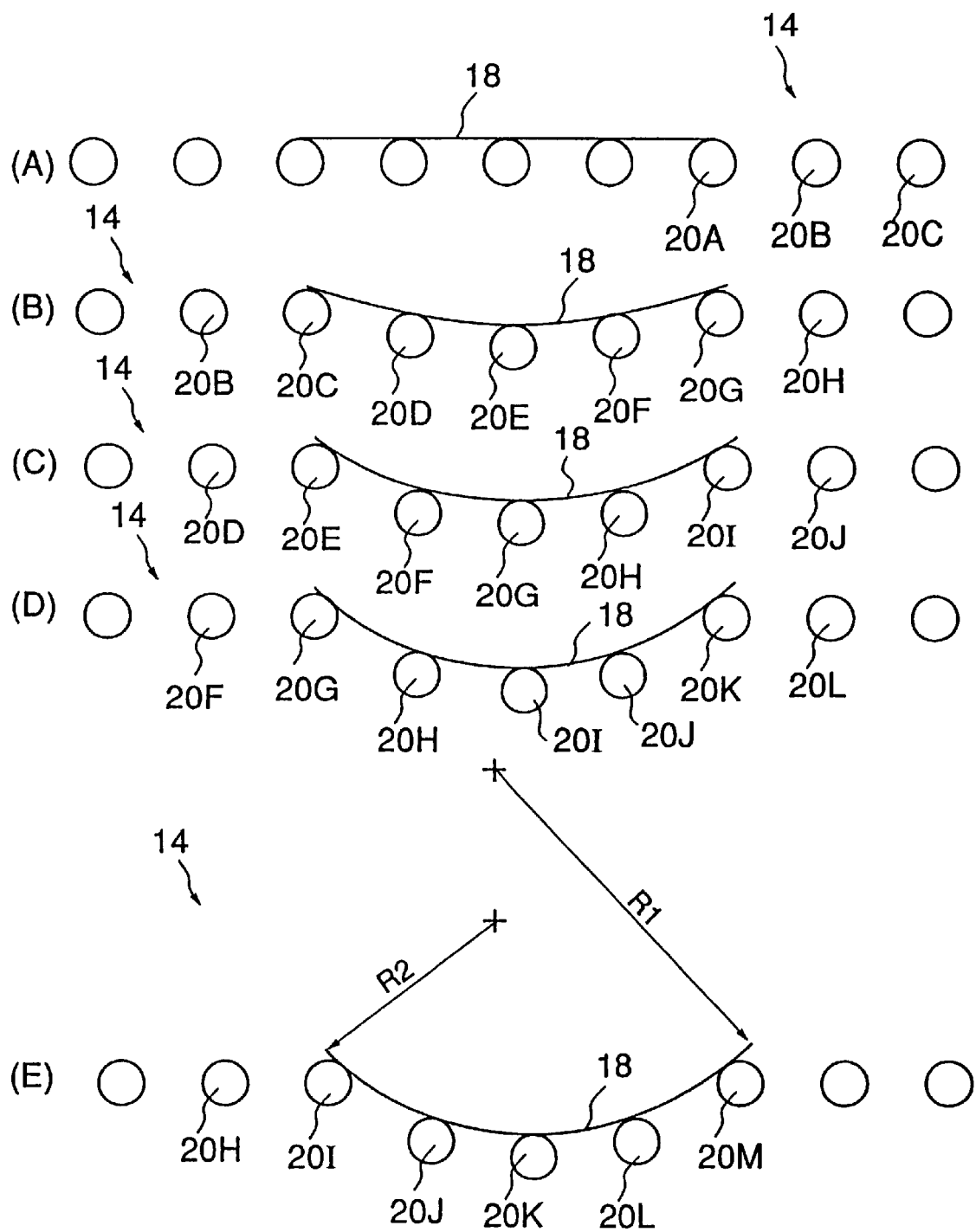
FIG. 12 is a transition diagram showing bending operations for the glass plate by a plurality of rollers arranged in the shaping zone.

In the following, a case of bend-shaping the glass plate 18 to have a combined curved plane which comprises a curved plane having a radius of curvature R1 and a curved plane having a radius of curvature R2 will be described with reference to FIG. 12. In this description, a character in brackets correspond to the same character in brackets in FIG. 12. In the following, description will be made as to an example of bend-shaping a glass plate having two different radius of curvatures. However, the bend-shaping of a glass plate having three or more different radius of curvatures can be carried out based on the same way of thinking.

In a state that the heated glass plate 18 reaches on the roller 20A at an inlet side, all the rollers 20A–20M are at the highest position, and a transferring plane formed by the rollers 20A–20M is horizontal (A). When rollers are sequentially descended, the transferring plane formed by rollers 20C–20G is changed to a gently curved shape (B). Accordingly, when the glass plate 18 is passed on the rollers 20C–20, it deflects downward due to its deadweight along the curved plane of the rollers 20C–20G so as to have a shape along that curved plane.

In transferring further the glass plate 18, rollers 20E–20I are descended further than the former rollers 20C–20G whereby a transferring plane formed between the rollers 20E–20I is changed to that of curved shape having a smaller radius of curvature than the former curved plane as a whole (C). The curved plane formed between the rollers 20E–20I is not formed with a single radius of curvature, but is formed to a curved plane in which two curved planes having different radius of curvatures are combined. Namely, it is formed by combining the curved plane having a smaller radius of curvature formed between the rollers 20E–20F and the curved plane having a larger radius of curvature formed between the rollers 20F–20I. With this, while the glass plate 18 is passed on the rollers 20E–20I, it is further bent downward along the curved plane formed by the rollers 20E–20I so that the shape is changed along the curved plane, i.e., a curved plane having two different radius of curvatures.

In transferring further the glass plate 18, rollers 20G–20K are descended further than the former rollers 20E–20I, so that a transferring plane formed between the rollers 20G–20K is changed to a shape of curved form which has a smaller radius of curvature than the former curved plane as a whole (D). The curved plane formed between the rollers 20G–20K is also formed into a shape in which two curved planes having different radius of curvatures are combined, in the same manner as the above. Namely, the curved plane is formed into a shape comprising a curved plane having a smaller radius of curvature formed between the rollers 20G–20H and a curved plane having a larger radius of curvature formed between the rollers 20H–20K. With this, when the glass plate 18 is passed on the rollers 20G–20K, it is further bent downward along the curved plane formed by the rollers 20G–20K, whereby the shape is changed to a shape along the curved planes, i.e. a plane having two radius of curvatures.

Finally, when the glass plate 18 reaches a position at a downstream of the transferring path in the shaping zone 14, rollers 20I–20M are descended further than the former rollers 20G–20K whereby a transferring plane formed between the rollers 20I–20M is changed into a curved plane which is in correspondence with a curvature of the glass plate 18 finally obtainable (E). Namely, the transferring plane formed between the rollers 20I–20J is curved to have a curved plane in which a radius of curvature is R2 and the transferring plane formed between the rollers 20J–20M is curved to have a curved plane in which a radius of curvature is R1. With this, when the glass plate 18 is passed on the rollers 20I–20M, it is further bent downward along the curved plane formed by the rollers 20I–20M whereby it is bend-shaped into a finally obtainable shape, i.e., a combined curved shape in which the curved plane having the radius of curvature R1 and the curved plane having the radius of curvature R2 are combined.

In the following, as an example of bend-shaping a glass plate to have a complexly curved shape, description will be made as to a bend-shaping method for bending a glass plate in a direction perpendicular to the transferring direction by using a cooling/shaping device 15 shown in FIG. 13.

The cooling/shaping device 15 cools an upper face and a lower face of the glass plate 18 in an ill-balanced manner whereby the glass plate 18 is bend-shaped in a direction perpendicular to the transferring direction. Namely, glass possesses such property that when a temperature difference is produced by cooling ill-balancedly the upper face and the lower face of the glass plate, the glass plate is deformed three-dimensionally due to the viscosity of glass. By utilizing such nature of glass, the cooling/shaping device 15 bend-shapes the glass plate 18 in a direction perpendicular to the transferring direction.

Figure 13:
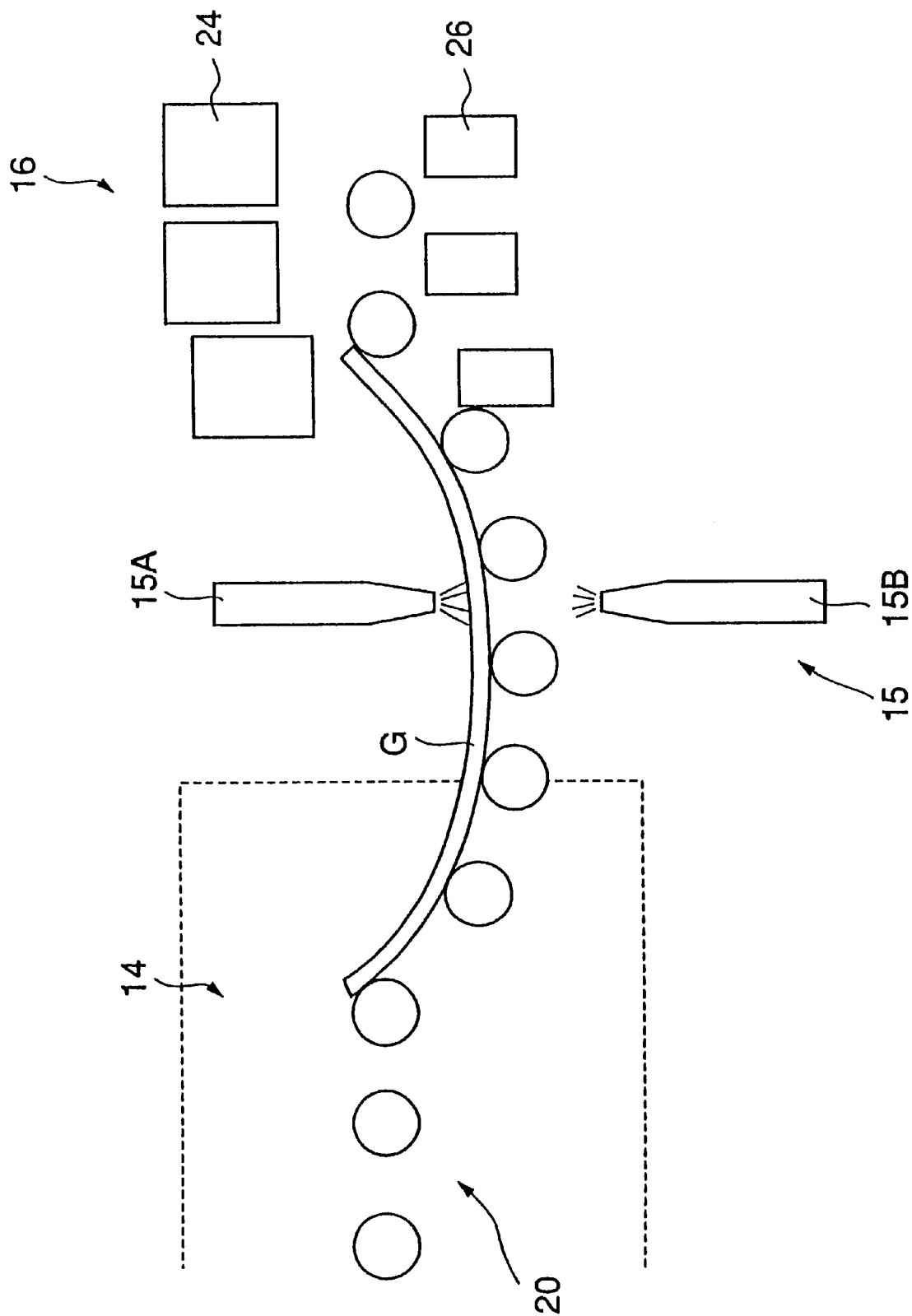
FIG. 13 is a side view showing the construction of a cooling/shaping device.

As shown in FIG. 13, the cooling/shaping device 15 is provided with an upper air blowing port 15A and a lower air blowing port 15B which are arranged so as to interpose therebetween a roller conveyor 20 for bend-shaping. The upper air blowing port 15A and the lower air blowing port 15B respectively have a slit-type port extending along a direction of the axial line of each roller. The upper and lower planes of the glass plate 18 are previously cooled with air blown from the upper blowing port 15A and the lower blowing port 15B while the glass plate is passed between the upper blowing port 15A and the lower blowing port 15B.

The wind pressure of air blown from the upper air blowing port 15A and the lower air blowing port 15B is controlled by a wind pressure controller although it is not shown. The wind pressure controller determines the wind pressure of air blown from the upper air blowing port 15A and the lower air blowing port 15B in the manner as follows. When a model of the glass plate 18 is inputted from an external inputting means, the wind pressure controller produces wind pressure data according to a curvature of the glass plate 18 of the model, and it determines a wind pressure of air to be blown from the upper air blowing port 15A and the lower air blowing port 15B based on the produced wind pressure data. Namely, the wind pressure controller determines a wind pressure of air to be blown from the upper air blowing port 15A and the lower air blowing port 15B so that the glass plate 18 is bend-shaped to have a desired curvature in a direction perpendicular to the transferring direction.

In the following, description will be made as to bend-shaping operations of the glass plate 18 conducted by the cooling/shaping device 15 constructed as described above.

The glass plat 18 bend-shaped in a direction of the transferring direction in the shaping zone 14 is transferred into the cooling/shaping device 15 by means of the roller conveyor 20 for bend-shaping. At this moment, the roller conveyor 20 transfers the glass plate 18 while the rollers are moved vertically so as to maintain the shape of the glass plate 18 which is finally obtained in the shaping zone 14 (the glass plate 18 is transferred while the transferring plane maintains a predetermined curved shape).

The glass plate 18 transferred into the cooling/shaping device 15 is passed between the upper air blowing port 15A and the lower air blowing port 15B. At the time of passing between the upper air blowing port 15A and the lower air blowing port 15B, the upper surface and the lower surface are cooled by air blown from the upper air blowing port 15A and the lower air blowing port 15B.

Air is blown from the upper air blowing port 15A and the lower air blowing port 15B wherein the wind pressure of air is controlled to be a predetermined pressure by the wind pressure controller, whereby the upper surface and the lower surface of the glass plate 18 are cooled in an ill-balanced manner by air, the pressure of which is controlled to a predetermined value. As a result, a temperature difference is produced between the upper and lower surfaces of the glass plate, and a predetermined bend-shaping operation is conducted in a direction perpendicular to the transferring direction.

The bend-shaping operation of the glass plate 18 in a direction perpendicular to the transferring direction with use of the cooling/shaping device 15 has been described as above. The glass plate 18 bend-shaped in a direction perpendicular to the transferring direction is moved from the roller conveyor 20 for bend-shaping onto a roller conveyor 22 for cooling/tempering, and it is transferred into a cooling/tempering device 16. Then, the glass plate is cooled and tempered by the cooling/tempering device 16.

Thus, bend-shaping in a direction perpendicular to the transferring direction can be conducted in addition to bend-shaping in a direction along the transferring direction, whereby the glass plate having a desired complexly curved shape can be formed.

The changing of curvature in a direction perpendicular to the transferring direction can be easily conducted by only changing a wind pressure of air blown from the upper air blowing port 15A and the lower air blowing port 15B. In this case, with respect to the determination of a wind pressure of air blown from the upper air blowing port 15A and the lower air blowing port 15B, shapes of glass plates for automobile windows are previously prepared as CAD data, the setting of wind pressure can easily be changed by linking the CAD data to the wind pressure controller.

With respect to the shape of the upper air blowing port 15A and the lower air blowing port 15B, various types of shape, e.g., a slit type, a serial arrangement of a large number of pipe-shaped blowing ports, and so on, can be considered. For the upper air blowing port 15A and the lower air blowing port 15B, a construction that air is blown uniformly along a direction of the axial line of the rollers or a construction that areas for blowing air are selected can be used. For example, it is possible that a blowing area is divided into three portions from which air can be blown selectively.

The upper air blowing port 15A and the lower air blowing port 15B are fixed at predetermined positions. However, they can be so constructed as to be movable vertically in association with rollers of the vertical movable roller conveyor 20 for bent-shaping. The cooling/shaping device 15 is preferably located at a position that the temperature of a glass plate is high and sensitivity to the shape under a change of cooling conditions is high.

In the following, another example of bend-shaping a glass plate into a complexly curved shape will be described. This example has such a construction that in addition to the rotation driving means and the vertical direction driving means, each roller 20A, 20B . . . of the roller conveyor 20 shown in FIG. 1 is inclined in a vertical direction independent from each other by a tilting mechanism. Thus, each of the rollers 20A, 20B, . . . is arranged horizontally side by side in the transferring direction, and is capable of being arranged with inclination with respect to a horizontal plane. Further, they can be arranged so that a direction of inclination of rollers adjacent to each other is alternately different (right rising and left rising in a front view).

Figure 14:
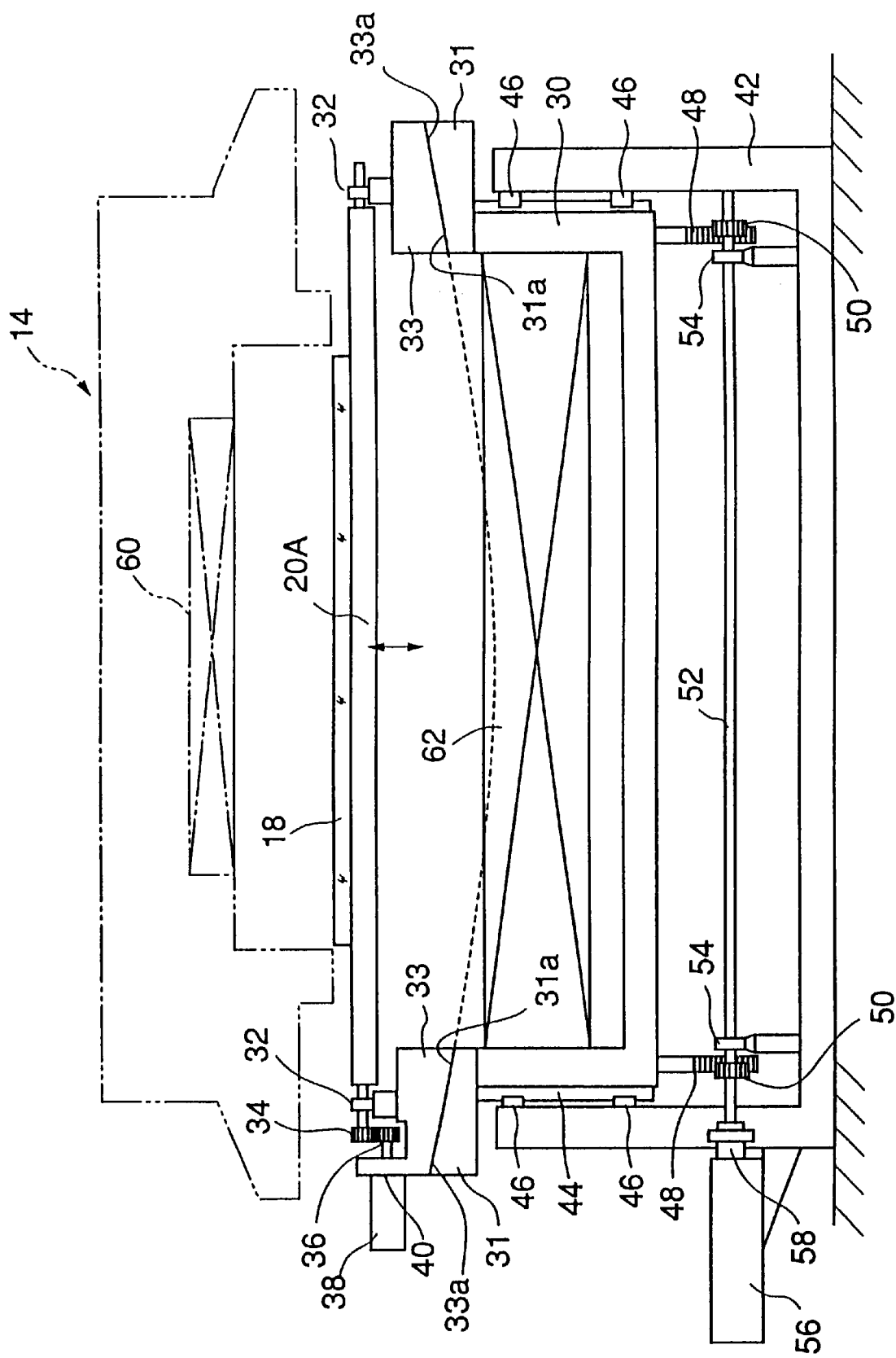
FIG. 14 is a front view showing the constructions of the roller-rotating/driving means, a vertical direction driving means and a tilting mechanism.

FIG. 14 is a front view showing constructions of the rotation driving means, the vertical direction driving means and the tilting mechanism for a roller 20A. For each of the rollers 20A, 20B, . . . , the constructions of the rotation driving means, the vertical direction driving means and the tilting mechanism are the same, and the constructions of the rotation driving means, the vertical direction driving means and the tilting mechanism for only the roller 20A are described for the purpose of convenience, and description of these constructions for the other rollers 20B, 20C, . . . is omitted.

The construction of the tilting mechanism is first described. Both ends of the roller 20A are rotatably supported by means of a pair of bearings 32, 32. The pair of bearings 32, 32 are respectively disposed on slide blocks 33, 33. The slide blocks 33, 33 are disposed in a manner of sliding on guide blocks 31, 31. The guide blocks 31, 31 are fixed to the top portion of a vertically movable frame 30 which is formed into a U-like shape. A guide surface 31a of the guide blocks 31 and a slide surface 33a of the slide blocks 33 are respectively formed to have a circular arc shape. Accordingly, when the slide blocks 33 are caused to slide along the guide surfaces 31a of the guide blocks 31, the roller 20A is oscillated. As a result, the roller 20A is inclined a predetermined angle from a horizontal state. The construction of the tilting mechanism is as above-mentioned. The roller 20A can be fixed to a inclined state by fixing the slide blocks 33 to the guide blocks 31 by means of a lock means (such as a set screw) although it is not shown.

The constructions of the rotation driving means and the vertical direction driving means are the same as those shown in FIG. 4 and accordingly, description is omitted. The direction capable of bend-shaping by moving vertically horizontally arranged rollers 20A, 20B, . . . is limited to only a direction along the transferring direction of the glass plate 18. Accordingly, it is impossible to bend-shape glass plates having a complexly curved shape by only this method. Accordingly, the following setting is necessary to bend-shape a glass plate having a complexly curved shape.

Figure 15:
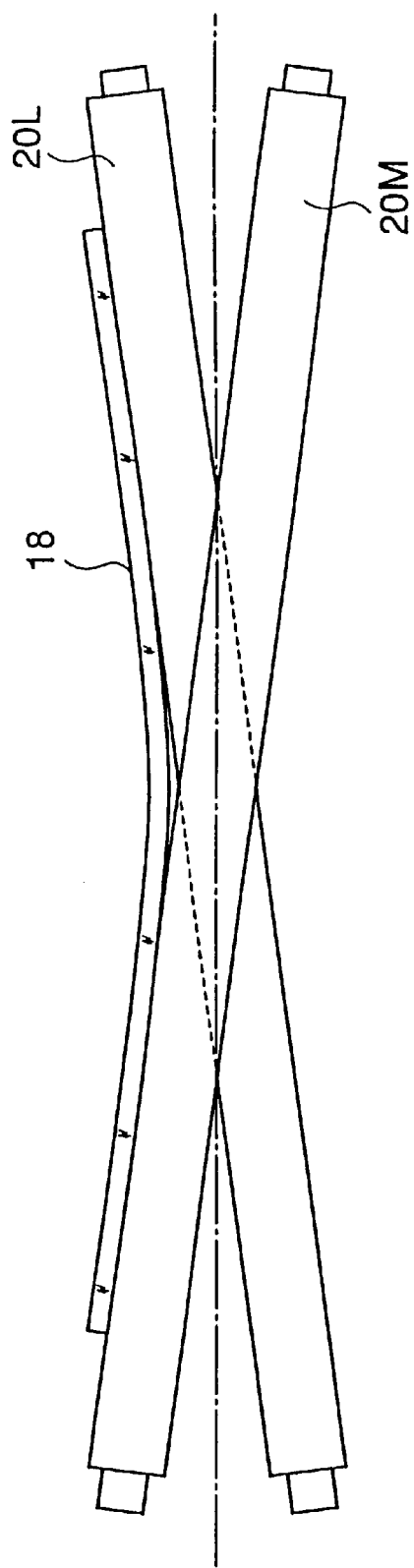
FIG. 15 is a front view showing a state of arranging rollers in the view from a downstream side in the transferring direction.

As described above, each of the rollers 20A, 20B, . . . is arranged so as to be capable of inclining in a vertical direction by means of the tilting mechanism. The transferring plane for a glass plate 18 can be curved in a direction perpendicular to the transferring direction of the glass plate 18 by inclining each of the rollers 20A, 20B, . . . so that a right rising state and a left rising state appear alternately (hereinbelow, referred to simply as "alternate inclination") in a front view of the rollers (reference to FIG. 15; FIG. 15 shows a roller 20L and a roller M). With this, the glass plate 18 is bent along the transferring plane of curved shape whereby it is bend-shaped to have a complexly curved shape with the vertical movement of each of the rollers.

The degree of a curve of the transferring plane formed by the inclinations of the rollers 20A, 20B, is rendered to be gradually increased toward a downstream side of the transferring path. Specifically, the transferring plane is formed flat, without any inclination of rollers, in an area from an inlet portion to an intermediate portion of the transferring path. The degree of inclination angle of rollers is gradually increased in an area from the intermediate portion to an outlet portion whereby a curvature finally obtainable is formed in the transferring plane at the outlet portion. With such arrangement, the glass plate 18 is gradually bend-shaped to have a predetermined curvature in a direction perpendicular to the transferring direction during being transferred on the roller conveyor 20.

In the next, bend-shaping operations of the glass plate 18 by the above-mentioned roller conveyor 20 will be described. The rollers 20A, 20B, . . . are sequentially moved vertically from an upstream side in the transferring direction with the transfer of the glass plate 18. The vertical movements of the rollers 20A, 20B, . . . in correspondence with the transfer of the glass plate 18 create a cured portion in the transferring plane of the roller conveyor 20 in the transferring direction. During the transfer of the glass plate 18 on the curved transferring plane, the glass plate 18 is bend-shaped in a direction along the transferring direction.

On the other hand, the rollers of the roller conveyor 20 are arranged in an alternately inclining state from around an intermediate portion of the transferring path. And, the degree of inclination angle is so determined as to gradually increase toward the outlet portion. By alternately inclining the rollers, the transferring plane of the roller conveyor 20 is curved in a direction perpendicular to the transferring direction. When the glass plate 18 is transferred on the curved transferring plane, the glass plate 18 is bend-shaped in a direction perpendicular to the transferring direction.

Figure 16:
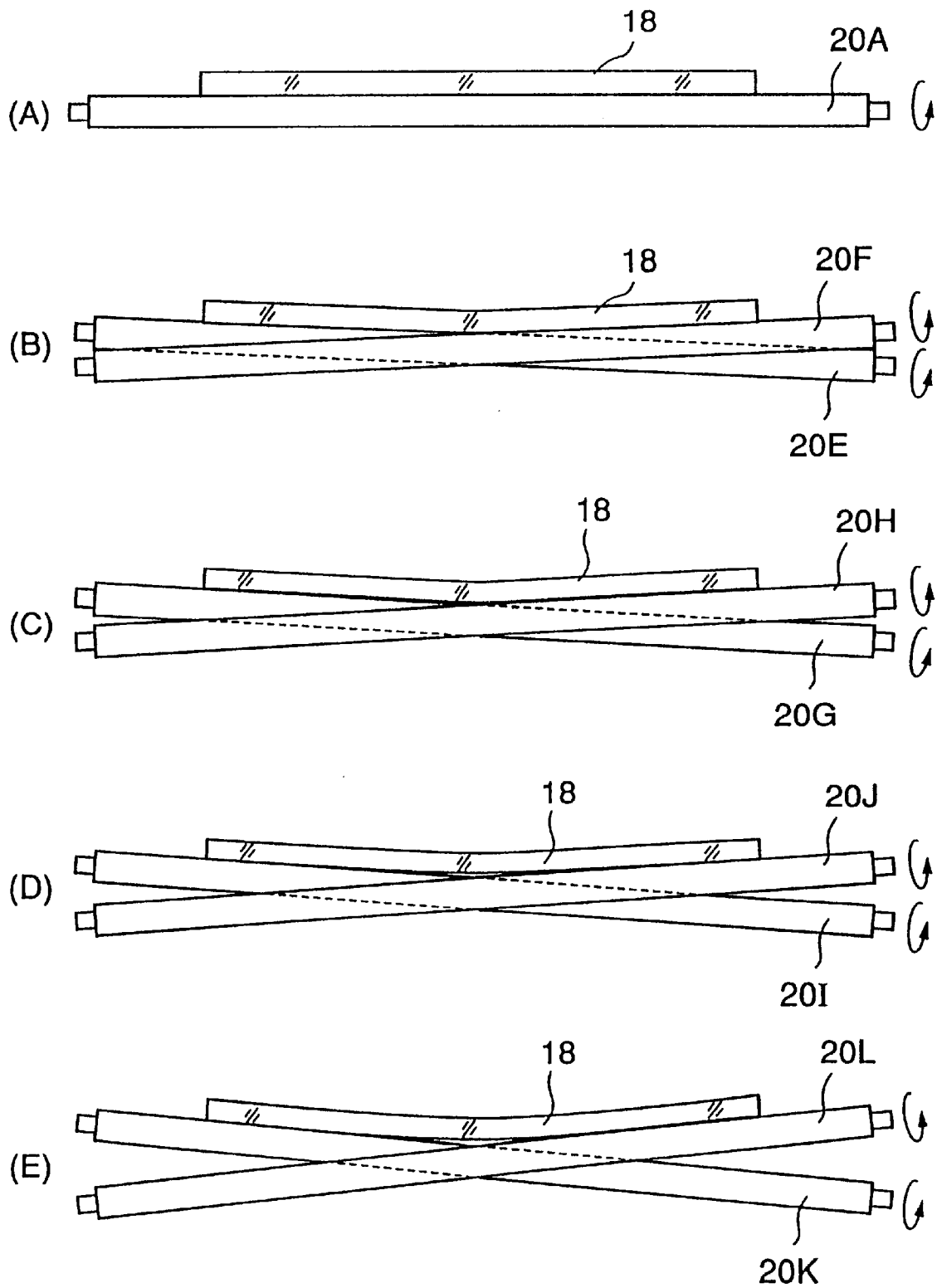
FIG. 16 is a transition diagram showing bending operations for the glass plate by means of a roller conveyor in the view from a downstream side in the transferring direction.

As described above, the roller conveyor 20 bend-shapes the glass plate 18 in a direction perpendicular to the transferring direction by arranging the rollers 20A, 20B, . . . in an alternately inclined state while the roller conveyor 20 bend-shapes the glass plate 18 in a direction along the transferring direction due to the vertical movements of the rollers 20A, 20B. . . . . In the combination of these bend-shaping, the glass plate 18 is bend-shaped into a complexly curved shape. A method for bend-shaping a glass plate in a direction perpendicular to the transferring direction will be described in detail with reference to FIG. 16. In description, a character in brackets correspond to the same character in brackets in FIG. 16.

Since the rollers 20A, 20B, . . . arranged near the inlet portion of the transferring path are in a flat state, the glass plate 18 is not bend-shaped in a direction perpendicular to the transferring direction even when it is passed on the rollers 20A, 20B, . . . (A).

At an intermediate portion of the transferring path, since the rollers 20E, 20F are inclined alternately, the transferring plane is curved in a direction perpendicular to the transferring direction (B). When the glass plate 18 is passed on the rollers 20E, 20F, it is bent due to its own weight along a curved plane formed by the rollers 20E, 20F whereby it is bend-shaped in a direction perpendicular to the transferring direction.

An angle formed by a roller 20G, and a roller 20H at a downstream side of the rollers 20E, 20F is further larger than an angle formed by the roller 20E and the roller 20F (C). Further, an angle formed by a roller 20I and a roller 20J at a downstream side of the rollers 20G, 20H is further larger than an angle formed by the roller 20G and the roller 20H (D). Accordingly, the glass plate 18 is bend-shaped so that the radius of curvature is gradually reduced when it is passed on the rollers 20G, 20H, 20I and 20J.

In a portion near the extreme end of the shaping zone, an angle formed by a roller 20K and a roller 20L is made further larger than an angle formed by the roller 20I and the roller 20J, and a curved plane formed by the rollers 20I, 20J has the same curvature as that of the finally obtainable glass plate 18 (E). The glass plate 18 is bend-shaped to have a finally obtainable curvature when it is passed on the rollers 20K, 20L.

Rollers 20M, 20N, . . . subsequent to the rollers 20K, 20L are arranged with alternate inclination at the same inclination angle as that of the rollers 20K, 20L, and these rollers transfer the glass plate 18 so as to maintain the curved shape of the glass plate.

Thus, the roller conveyor 20 bend-shapes the glass plate 18 in a direction perpendicular to the transferring direction by the alternately inclined rollers 20A, 20B, . . . while it bend-shapes the glass plate 18 in a direction along the transferring direction due to vertical movements of the rollers 20A, 20B, . . . . By the combination of these bend-shaping, the glass plate 18 is bend-shaped into a complexly curved shape. Thus, bend-shaping in a direction perpendicular to the transferring direction as well as bend-shaping in a direction along the transferring direction can be conducted. With such technique, the glass plate 18 can be bend-shaped to have a desired complexly curved shape. The construction of the apparatus is very simple, and the curvature can easily be changed by changing an angle of inclination of rollers. With this, the glass plate 18 having desired complexly curved shape can easily be bend-shaped.

Figure 17:
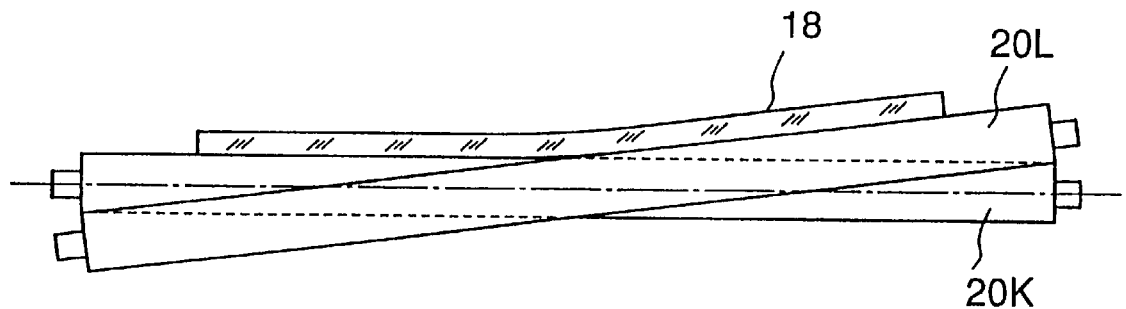
FIG. 17 is a front view showing a state of arranging rollers in the view from a downstream side in the transferring direction.
Figure 18:
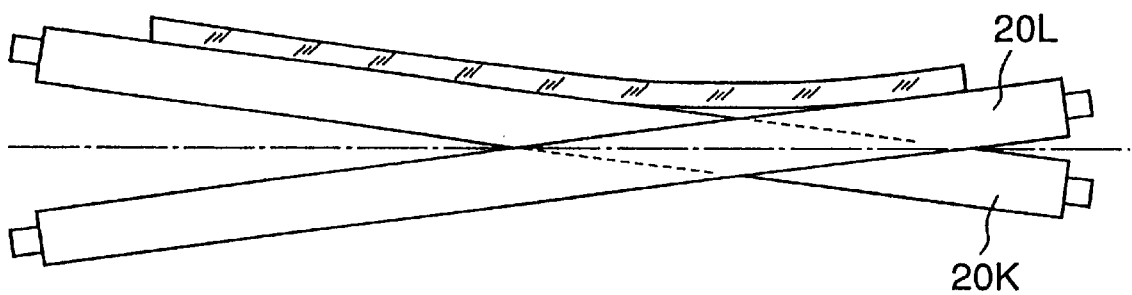
FIG. 18 is a front view showing a state of arranging rollers in the view from a downstream side in the transferring direction.

Each of the rollers can be crossed at a position shifted at a predetermined distance in a lateral direction from the center as shown in FIG. 17 (which shows rollers 20L, 20M). As shown in FIG. 18 (which shows rollers 20L, 20M), one of adjacent rollers can be inclined alternately. Even with such technique, the glass plate can be bend-shaped to have a desired curvature in a direction perpendicular to the transferring direction. In a case of bend-shaping only in a direction perpendicular to the transferring direction, the glass plate 18 is transferred without causing the vertical movements of the rollers. Besides the above-mentioned technique that the rollers are alternately inclined from a portion around an intermediate portion in the transferring path and the degree of inclination angle is gradually increased, a technique that rollers are alternately inclined from an inlet portion and the degree of inclination angle is gradually increased can be employed.

A technique described below is also effective to shape the glass plate into a complexly curved shape. In the before-mentioned embodiments, the rollers 20A–20M are formed to be straight. By changing these rollers to rollers which are curved in a direction perpendicular to the transferring direction, the glass plate is bend-shaped into a complexly curved shape.

As the vertical direction driving means, FIG. 4 shows an example that each of the rollers 20A, 20B, is moved vertically by the action of the rack and the pinion. However, various systems can be used as the vertical direction driving means other than the above-mentioned system. For example, a system as shown in FIG. 19 or FIG. 20 may be used as the vertical direction driving means.

Figure 19:
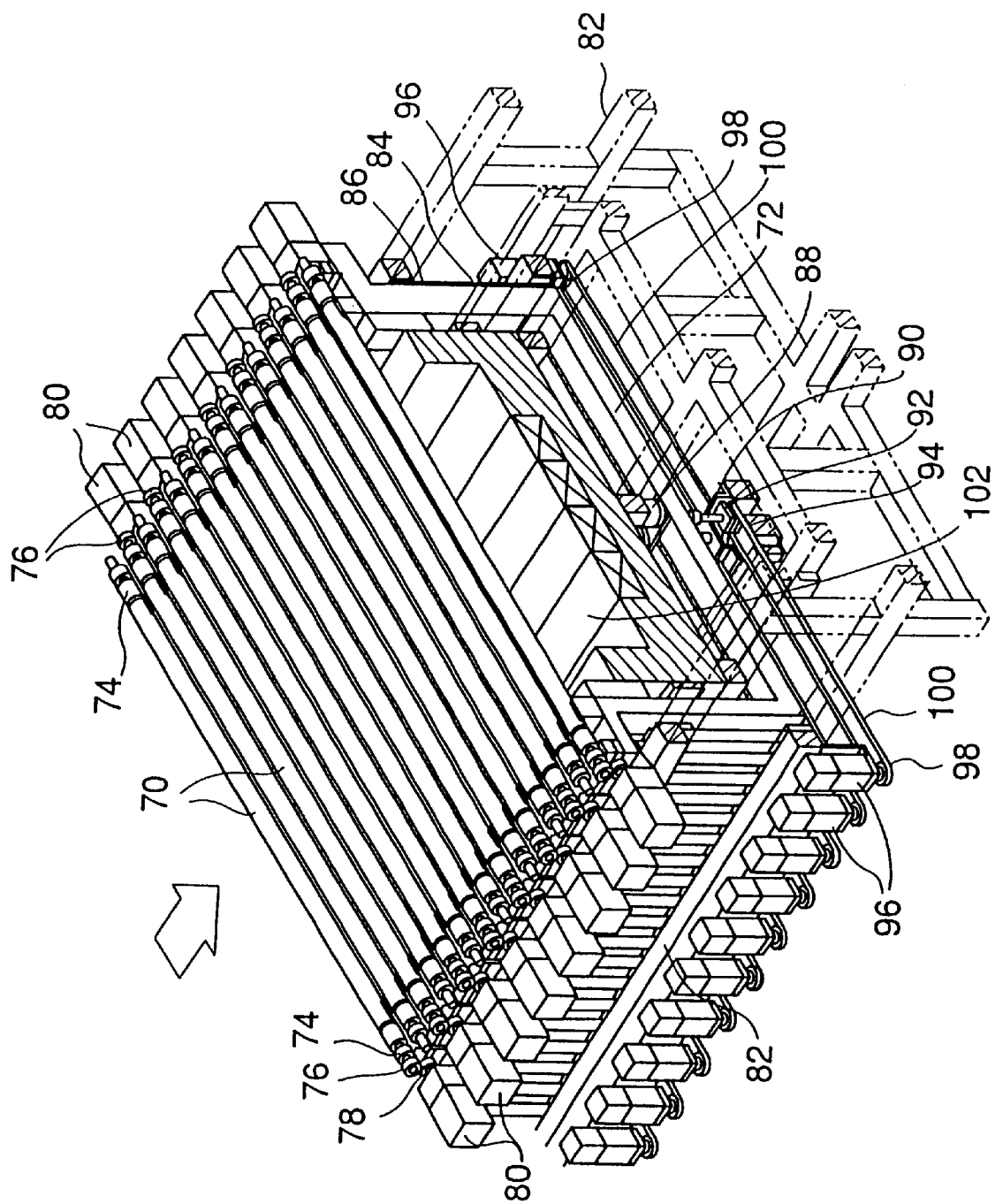
FIG. 19 is a perspective view of an embodiment of the vertical direction driving means.
Figure 20:
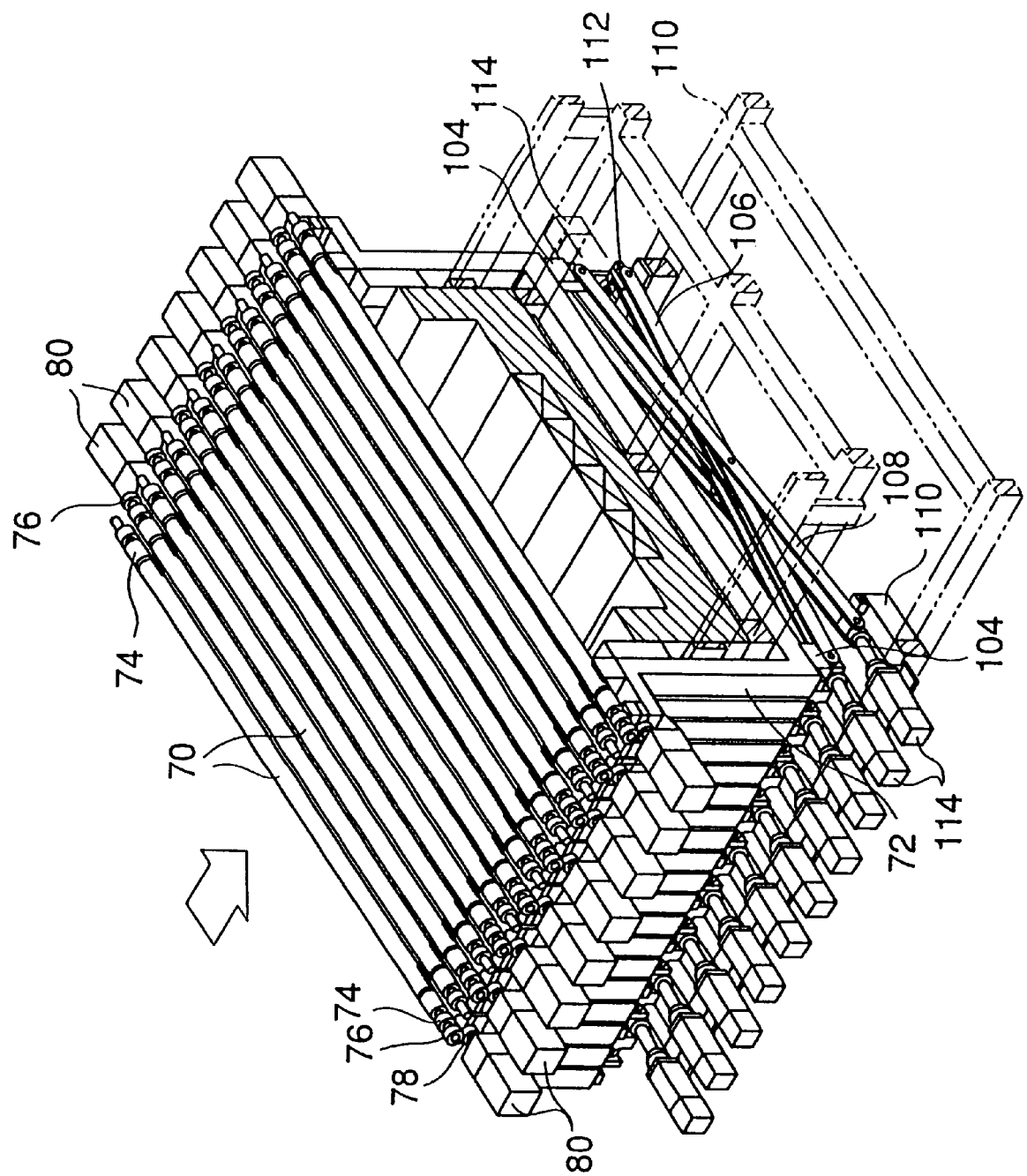
FIG. 20 is a perspective view of an embodiment of the vertical direction driving means.

The vertical direction driving means shown in FIG. 19 is of a type using a feed screw, which is constructed as follows. Each roller 70, 70, . . . is supported rotatably on each moving frame 72, 72, . . . each having both ends of recesses shape by each bearing 74, 74, . . . Each of the rollers 70, 70, . . . respectively has an end which is connected with the spindle of each servomotor 80, 80, . . . by interposing gear wheels 76, 78. Each of the rollers 70, 70, . . . is rotated at a predetermined angular speed by driving each of the servomotors 80, 80, . . .

The moving frames 72, 72, . . . for supporting the rollers 70, 70, . . . respectively have both side portions which are supported by a fixed frame 82 so as to be movable vertically by means of LM guides. The LM guides are provided, at a side of the moving frames 72, 72, . . . , with guide rails 84, 84, . . . extending in a vertical direction. Guide blocks 86, 86, . . . arranged at a side of the fixed frame 82 are engaged with the guide rails 84, 84, . . .

Nut members 88, 88, . . . are respectively fixed to a central portion in a lower portion of each of the moving frames 72, 72, . . . , and screw rods 90, 90, . . . are fitted to the nut members 88, 88, . . . . The screw rods 90, 90, . . . are rotatably supported by bearings 92, 92, . . . attached to the fixed frame 82, and driven pulleys 94, 94, . . . are fixed to a lower end portion of the fixed frame. On the other hand, servomotors 96, 96, . . . are attached to the fixed frame 82, and the spindles of the servomotors 96, 96, . . . are attached with driving pulleys 98, 98, . . . . Driving belts 100, 100, . . . are wound on the driving pulleys 98, 98, . . . and driven pulleys 94, 94, . . . so that the rotation of the servomotors 96, 96, . . . is transmitted to the screw rods 90, 90, . . . through the driving belts 100, 100, . . . . The rotation of the screw rods 90, 90, . . . causes a vertical movement of the moving frames 72, 72, . . . , i.e., the rollers 70, 70, . . . depending on a quantity of rotation.

The vertical direction driving means using the feed screw has the construction described above. In FIG. 19, reference numeral 102 designates a heater provided in the shaping zone 14.

The vertical direction driving means shown in FIG. 20 is of a type using a pantograph, which is constructed as described below. Each roller 70, 70, . . . is supported rotatably by each moving frame 72, 72, . . . having both ends of recesses shape by means of bearings 74, 74, . . . . Each of the rollers 70, 70, . . . has an end portion which is connected with the spindle of each servomotor 80, 80, . . . by means of gear wheels 76, 78. Each of the rollers 70, 70, . . . is rotated at a predetermined angular speed by driving the servomotors 80, 80, . . . .

Both end portions of links 106, 108 are connected by means of pins to both ends in a lower portion of each of the moving frames 72, 72, . . . through brackets 104, 104, . . . respectively. The links 106, 108 are arranged so as to intersect each other, and the portion of intersection is connected by means of a pin. End portions of the links 106, 106, . . . are connected by means of pins to brackets 112, 112, . . . attached to a fixed frame 110, and end portions of the links 108, 108, . . . are connected by means of pins to end portions of rods of cylinders 114, 114, . . . provided at the fixed frame 110. When the cylinders 114, 114, . . . are driven to extend and retract the rods, the moving frames 72, 72, . . . are moved vertically by the action of the links 106, 108 whereby the rollers 70, 70, . . . are moved vertically.

The vertical direction driving means using the pantograph has the construction as described above. In FIG. 20, reference numeral 102 designates a heater provided in the shaping zone 104.

INDUSTRIAL APPLICABILITY

As described above, the bend-shaping method and apparatus for a glass plate according to the present invention are adapted to move a plurality of rollers in a vertical direction depending on a position of transfer of a glass plate to bend a transferring plane formed by the rollers whereby the glass plate is bend-shaped to have a predetermined curvature due to its own weight. In this case, the curved plane formed by the rollers is shifted in a direction of transfer with the advancing of the glass plate. With the bend-shaping method and apparatus for a glass plate according to the present invention, a glass plate can be bend-shaped without using a plurality of rollers having a curvature formed according to a model. Accordingly, the bend-shaping method and apparatus for a glass plate according to the present invention can omit operations for exchanging rollers which are needed in a conventional technique.

Further, according to the bend-shaping method and apparatus for a glass plate according to the present invention, a glass plate of another model can be shaped by only changing control data for moving vertically the rollers. Accordingly, a job-change time can substantially be eliminated. Further, a curved plane can be provided at a position where a glass plate on the transferring plane is, by simply moving vertically a plurality of rollers, and the transfer of the glass plate can smoothly be carried out since the curved plane is simply shifted.

By controlling a rotation driving means for a plurality of rollers so that a transferring rate on a horizontal component of a glass plate, a glass plate free from flaws can be obtained.

What is claimed is:

1. A bend-shaping method for a glass plate comprising the steps of:

heating a glass plate to a bend-shaping temperature in a heating furnace; and transferring the heated glass plate along a transferring plane formed by a plurality of rollers of a roller conveyor during which the glass plate is bend-shaped to have a predetermined curvature due to a dead weight of the glass plate, wherein said rollers for forming a transferring plane are moved vertically depending on a position of transfer of the glass plate to form a curve in at least a part of the transferring plane so that a predetermined curved plane is formed at the position of transfer where the glass plate is, and the curved plane is shifted in a propagation of a wave from an upstream side to a downstream side of the roller conveyor whereby the glass plate is bend-shaped to have a predetermined curvature along the curved plane.

2. A bend-shaping method for a glass plate comprising the steps of:

heating a glass plate to a bend-shaping temperature in a heating furnace; and transferring the heated glass plate along a transferring plane formed by a plurality of rollers which are arranged side by side in a transferring direction of the glass plate during which the glass plate is bend-shaped to have a predetermined curvature due to a dead weight of the glass plate, wherein a plurality of rollers at a position where the glass plate is transferred are moved vertically with the transfer of the glass plate so that a predetermined curved plane, which is curved in the transferring direction of the glass plate, is formed in at least a part of the transferring plane by means of the plurality of rollers at said position, and each of the rollers is sequentially moved vertically with the transfer of the glass plate to shift the curved plane in the transferring direction of the glass plate with the transfer of the glass plate whereby the glass plate is bend-shaped so as to meet the curved plane during the transfer of the glass plate.

3. The bend-shaping method for a glass plate according to claim 1, wherein with respect to the vertical movement of each of the rollers, each of the rollers is vertically moved in the order of (a), (b) and (c) on successively transferred glass plates as units, where (a) represents the beginning of ascending or descending of a roller at the time of the transfer of a front edge in a transferring direction of a glass plate as one unit; (b) represents a one cycle in a movement of descending to ascending or a movement of ascending to descending during the transfer of the glass plate as one unit, and (c) represents the movement of returning to the original position at the time of the transfer of a rear edge in the transferring direction of the glass plate as one unit.

4. The bend-shaping method for a glass plate according to claim 1, wherein a radius of curvature of the curved plane is reduced toward a downstream side in the transferring direction of the glass plate.

5. The bend-shaping method for a glass plate according to claim 1, wherein the curved plane is formed into a shape curved only in the transferring direction.

6. The bend-shaping method for a glass plate according to claim 1, wherein in forming the curved plane, the curved plane is a wave plane of downward convex shape or a wave plane of upward convex shape; each of the rollers is an oscillating element and a stroke length in the vertical movement of each roller is an amplitude of a wave, a phase difference is effected to the vertical movement of each of the rollers so that the phase of each roller as an oscillating element is sequentially changed toward a downstream in the transferring direction, and the glass plate is transferred while the wave plane formed by the curved plane is shifted in the transferring direction, whereby the glass plate is bend-shaped to meet the curved plane.

7. In a bend-shaping method for a glass plate comprising heating a glass plate to a bend-shaping temperature in a heating furnace and transferring the heated glass plate along a transferring plane formed by a plurality of rollers of a roller conveyor during which the glass plate is bend-shaped to have a predetermined curvature due to the dead weight of the glass plate, the bend-shaping method for a glass plate being characterized in that said rollers for forming a transferring plane are moved vertically depending on a position of transfer of the glass plate to form a curve in at least a part of the transferring plane so that a predetermined curved plane is formed at the position of transfer where the glass plate is, and the curved plane is shifted in a propagation of a wave from an upstream side to a downstream side of the roller conveyor whereby the glass plate is bend-shaped to have a predetermined curvature along the curved plane, wherein the position in a vertical direction of each roller corresponding to a front edge in the transferring direction of a glass plate and the position in the vertical direction of each roller corresponding the transferring direction to a rear edge in the transferring direction of the glass plate are maintained to a transferring level which is formed by the original position of each of the rollers, and the glass plate is transferred while an intermediate portion which is a portion between the front edge and the rear edge in the transferring direction of the glass plate is determined to be upper or lower than the transferring level whereby the glass plate is bend-shaped to meet the curved plane.

8. A bend-shaping apparatus for a glass plate comprising:
a heating furnace for heating a glass plate to a bend-shaping temperature; and
a shaping means, located at a downstream side of the heating furnace, for bend-shaping the glass plate to have a predetermined curvature,
wherein said shaping means comprises:
a roller conveyor comprising a plurality of rollers which form a transferring plane for transferring the glass plate,
a vertical direction driving means for moving vertically the plurality of rollers, and
a control means for controlling the driving means to move vertically the rollers so that at least a part of the transferring plane is bent to have a curvature which corresponds to a curvature of the glass plate to be formed whereby a predetermined curved plane is formed by the rollers at the position where the transferred glass plate is, and the curved plane is shifted in a propagation of a wave from an upstream side to a downstream side of the roller conveyor, wherein the glass plate is transferred during the shift of the curved plane whereby the glass plate is bend-shaped to have a predetermined curvature to meet the curved plane.

9. A bend-shaping apparatus for a glass plate comprising:
a heating furnace for heating a glass plate to a bend-shaping temperature; and
a shaping means, located at a downstream side of the heating furnace, for bend-shaping the glass plate to have a predetermined curvature,
wherein said shaping means comprises:
a roller conveyor comprising a plurality of rollers which are arranged side by side in the transferring direction of the glass plate to form a transferring plane for transferring the glass plate,
a vertical direction driving means for moving vertically the plurality of rollers, and
a control means for controlling the driving means to form a predetermined curved plane curved in the transferring direction of the glass plate in at least a part of the transferring plane by the rollers at the position where the transferred glass plate is, and to move sequentially in a vertical direction the plurality of rollers with the transfer of the glass plate whereby the curved plane is shifted in the transferring direction of the glass plate.

10. The bend-shaping apparatus for a glass plate according to claim 8, wherein the control means controls the vertical movement of each of the rollers such that each of the rollers is vertically moved in the order of (a), (b) and (c) on successively transferred glass plates as units, where (a) represents the beginning of ascending or descending of each roller at the time of the transfer of a front edge in a transferring direction of a glass plate as one unit; (b) represents a one cycle in a movement of descending to ascending or a movement of ascending to descending during the transfer of the glass plate as one unit, and (c) represents the movement of returning to the original position at the time of the transfer of a rear edge in the transferring direction of the glass plate as one unit.

11. The bend-shaping apparatus for a glass plate according to claim 8, wherein a rotation driving means for rotating the rollers is provided, and said control means controls the rotation driving means so that a transferring speed on a horizontal component of the glass plate is constant.

12. The bend-shaping apparatus for a glass plate according to claim 8, wherein the curved plane is formed into a shape curved only in the transferring direction.

13. The bend-shaping apparatus for a glass plate according to claim 8, wherein the control means controls to form the curved plane such that the curved plane is a wave plane of downward convex shape or a wave plane of upward convex shape; each of the rollers is an oscillating element and a stroke length in the vertical movement of each roller is an amplitude of a wave, a phase difference is effected to the vertical movement of each of the rollers so that the phase of each roller as an oscillating element is sequentially changed toward a downstream in the transferring direction, and the glass plate is transferred while the wave plane formed by the curved plane is shifted in the transferring direction, whereby the glass plate is bend-shaped to meet the curved plane.

14. In a bend-shaping apparatus for a glass plate comprising a heating furnace for heating a glass plate to a bend-shaping temperature and a shaping means, located at a downstream side of the heating furnace, for bend-shaping the glass plate to have a predetermined curvature, the bend-shaping apparatus for a glass plate being characterized in that:

said shaping means comprises:
a roller conveyor comprising a plurality of rollers which form a transferring plane for transferring the glass plate,
a vertical direction driving means for moving vertically the plurality of rollers, and
a control means which controls the driving means to move vertically the rollers so that at least a part of the transferring plane is bent to have a curvature which corresponds to a curvature of the glass plate to be formed whereby a predetermined curved plane is formed by the rollers at the position where the transferred glass plate is, and the curved plane is shifted in a propagation of a wave from an upstream side to a downstream side of the roller conveyor, wherein the glass plate is transferred during the shift of the curved plane whereby the glass plate is bend-shaped to have a predetermined curvature to meet the curved plane, wherein the glass plate is transferred so that the position of the roller corresponding to a front edge in the transferring direction of a transferred glass plate and the position of the roller corresponding to a rear edge in the transferring direction of the transferred glass plate are at the original positions of the rollers, and the position of the rollers corresponding to an intermediate portion which is a portion between the front edge and the rear edge in the transferring direction of the glass plate is upper or lower than the transferring level formed by the original position of each of the rollers.

15. The bend-shaping method for a glass plate according to claim 2, wherein with respect to the vertical movement of each of the rollers, each of the rollers is vertically moved in the order of (a), (b) and (c) on successively transferred glass plates as units, where (a) represents the beginning of ascending or descending of a roller at the time of the transfer of a front edge in a transferring direction of a glass plate as one unit; (b) represents a one cycle in a movement of descending to ascending or a movement of ascending to descending during the transfer of the glass plate as one unit, and (c) represents the movement of returning to the original position at the time of the transfer of a rear edge in the transferring direction of the glass plate as one unit.

16. The bend-shaping method for a glass plate according to claim 2, wherein a radius of curvature of the curved plane is reduced toward a downstream side in the transferring direction of the glass plate.

17. The bend-shaping method for a glass plate according to claim 2, wherein the curved plane is formed into a shape curved only in the transferring direction.

18. The bend-shaping method for a glass plate according to claim 2, wherein in forming the curved plane, the curved plane is a wave plane of downward convex shape or a wave plane of upward convex shape; each of the rollers is an oscillating element and a stroke length in the vertical movement of each roller is an amplitude of a wave, a phase difference is effected to the vertical movement of each of the rollers so that the phase of each roller as an oscillating element is sequentially changed toward a downstream in the transferring direction, and the glass plate is transferred while the wave plane formed by the curved plane is shifted in the transferring direction, whereby the glass plate is bend-shaped to meet the curved plane.

19. In a bend-shaping method for a glass plate comprising heating a glass plate to a bend-shaping temperature in a heating furnace and transferring the heated glass plate along a transferring plane formed by a plurality of rollers which are arranged side by side in a transferring direction of the glass plate during which the glass plate is bend-shaped to have a predetermined curvature due to the dead weight of the glass plate, the bend-shaping method for a glass plate being characterized in that a plurality of rollers at a position where the glass plate is transferred are moved vertically with the transfer of the glass plate so that a predetermined curved plane, which is curved in the transferring direction of the glass plate, is formed in at least a part of the transferring plane by means of the plurality of rollers at said position, and each of the rollers is sequentially moved vertically with the transfer of the glass plate to shift the curved plane in the transferring direction of the glass plate with the transfer of the glass plate whereby the glass plate is bend-shaped so as to meet the curved plane during the transfer of the glass plate, wherein the position in a vertical direction of each roller corresponding to a front edge in the transferring direction of a glass plate and the position in the vertical direction of each roller corresponding the transferring direction to a rear edge in the transferring direction of the glass plate are maintained to a transferring level which is formed by the original position of each of the rollers, and the glass plate is transferred while an intermediate portion which is a portion between the front edge and the rear edge in the transferring direction of the glass plate is determined to be upper or lower than the transferring level whereby the glass plate is bend-shaped to meet the curved plane.

20. The bend-shaping apparatus for a glass plate according to claim 9, wherein the control means controls the vertical movement of each of the rollers such that each of the rollers is vertically moved in the order of (a), (b) and (c) on successively transferred glass plates as units, where (a) represents the beginning of ascending or descending of each roller at the time of the transfer of a front edge in a transferring direction of a glass plate as one unit; (b) represents a one cycle in a movement of descending to ascending or a movement of ascending to descending during the transfer of the glass plate as one unit, and (c) represents the movement of returning to the original position at the time of the transfer of a rear edge in the transferring direction of the glass plate as one unit.

* * * * *

UNITED STATES PATENT AND TRADEMARK OFFICE
CERTIFICATE OF CORRECTION

PATENT NO.    : 6,397,634 B1
DATED         : June 4, 2002
INVENTOR(S)   : Takeda et al.

It is certified that error appears in the above-identified patent and that said Letters Patent is hereby corrected as shown below:

<u>Title page, Item [63], and Column 1, line 3,</u>
The Related U.S. Application Data has been omitted. It should read as follows:
-- Related U.S. Application Data
   [63] This application is a continuation-in-part of International Application No. PCT/JP99/03259 filed June 18, 1999. --
Item [30], Foreign Application Priority Data is incorrect. It should read as follows:
-- [30]    Foreign Application Priority Data
   Jun. 19, 1998   (JP) ..........................10-173103 --

Signed and Sealed this

Fifteenth Day of October, 2002

*Attest:*

*Attesting Officer*

JAMES E. ROGAN
*Director of the United States Patent and Trademark Office*